United States Patent
Vidhi et al.

(10) Patent No.: US 10,819,269 B2
(45) Date of Patent: Oct. 27, 2020

(54) DC INTEGRATION OF PHOTOVOLTAIC AND DFIG WIND TURBINE GENERATION WITH ELECTRIC STORAGE

(71) Applicant: Inventus Holdings, LLC, Juno Beach, FL (US)

(72) Inventors: Rachana Vidhi, Palm Beach Gardens, FL (US); Daniel M. Brake, Hobe Sound, FL (US); Ryan K. McMorrow, Jupiter, FL (US)

(73) Assignee: INVENTUS HOLDINGS, LLC, Juno Beach, FL (US)

(*) Notice: Subject to any disclaimer, the term of this patent is extended or adjusted under 35 U.S.C. 154(b) by 121 days.

(21) Appl. No.: 15/880,098

(22) Filed: Jan. 25, 2018

(65) Prior Publication Data

US 2018/0152131 A1    May 31, 2018

Related U.S. Application Data

(63) Continuation-in-part of application No. 15/669,039, filed on Aug. 4, 2017, now Pat. No. 10,312,693.

(Continued)

(51) Int. Cl.
*H02S 10/12* (2014.01)
*G05F 1/67* (2006.01)
(Continued)

(52) U.S. Cl.
CPC ............. *H02S 10/12* (2014.12); *F03D 9/11* (2016.05); *F03D 9/255* (2017.02); *G05F 1/67* (2013.01);
(Continued)

(58) Field of Classification Search
CPC . F03D 9/007; F03D 9/255; F03D 9/11; Y02E 10/58; Y02E 10/725; G05F 1/67; H02S 10/12
See application file for complete search history.

(56) References Cited

U.S. PATENT DOCUMENTS 6,914,411 B2    7/2005 Couch et al.
9,397,497 B2 *  7/2016 Ledenev ............... H02J 1/102
(Continued)

FOREIGN PATENT DOCUMENTS

EP    2104216 A1    9/2009
EP    1796259 B1    9/2015
(Continued)

OTHER PUBLICATIONS

Solar Choice Staff: "AC vs DC battery storage explained (with Magellan Power)", Solar Choice (Oct. 27, 2015), https://www.solarchoice.net.au/blog/ac-vs-dc-solar-battery-storage-explained.
(Continued)

*Primary Examiner* — Alfonso Perez Borroto
*Assistant Examiner* — Esayas G Yeshaw
(74) *Attorney, Agent, or Firm* — Tarolli, Sundheim, Covell & Tummino LLP

(57) ABSTRACT

A power generation and storage system is provided that supplies power to a power grid. The system includes a wind turbine, a doubly-fed induction generator coupled to the wind turbine, and one or more DC energy sources. A controller determines power requirements for the power grid and controls the operation of the wind turbine and the DC energy sources to meet the power requirements of the power grid.

18 Claims, 16 Drawing Sheets

Related U.S. Application Data

(60) Provisional application No. 62/385,463, filed on Sep. 9, 2016.

(51) Int. Cl.
  *F03D 9/11* (2016.01)
  *F03D 9/25* (2016.01)
  *F03D 9/00* (2016.01)

(52) U.S. Cl.
  CPC .............. *F03D 9/007* (2013.01); *Y02E 10/58* (2013.01); *Y02E 10/725* (2013.01)

(56) References Cited

U.S. PATENT DOCUMENTS

| | | | |
|---|---|---|---|
| 2007/0216165 A1* | 9/2007 | Oohara | C25B 15/02 290/44 |
| 2008/0179887 A1 | 7/2008 | Kawazoe et al. | |
| 2011/0215640 A1 | 8/2011 | Donnelly et al. | |
| 2014/0091628 A1 | 4/2014 | Thompson | |
| 2015/0180323 A1* | 6/2015 | Wagoner | H02M 3/158 307/23 |
| 2016/0065115 A1 | 3/2016 | Pugina | |
| 2016/0308361 A1* | 10/2016 | Zhao | H02J 1/12 |
| 2017/0033561 A1* | 2/2017 | Lim | H02J 3/32 |
| 2017/0040795 A1* | 2/2017 | Jung | H02J 1/102 |
| 2017/0093156 A1 | 3/2017 | Ozbek et al. | |
| 2017/0168516 A1* | 6/2017 | King | H02J 7/34 |
| 2017/0229907 A1* | 8/2017 | Hoffmann | F03D 9/255 |
| 2018/0233914 A1* | 8/2018 | Miki | H02J 3/00 |

FOREIGN PATENT DOCUMENTS

| | | |
|---|---|---|
| EP | 3187727 A1 | 11/2017 |
| JP | 5501183 B2 | 5/2014 |

OTHER PUBLICATIONS

Locment, et al.: "DC Load and Batteries Control Limitations for Photovoltaic Systems. Experimental Validation"; IEEE Transactions on Power Electronics, vol. 27, No. 9, Sep. 2012, pp. 4030-4038.

International Search Report corresponding to International Application No. PCT/US2019/015076 dated May 8, 2019.

* cited by examiner

DC INTEGRATION OF PHOTOVOLTAIC AND DFIG WIND TURBINE GENERATION WITH ELECTRIC STORAGE

CROSS-REFERENCE TO RELATED APPLICATION

This application is a Continuation-in-Part of pending U.S. patent application Ser. No. 15/669,039, filed on 4 Aug. 2017, which claims the benefit of priority to U.S. Provisional Application No. 62/385,463 filed on 9 Sep. 2016 the entireties of the above-noted applications are herein incorporated by reference.

TECHNICAL FIELD

This disclosure relates to a power generation system that couples a doubly fed induction generator (DFIG) wind turbine and a photovoltaic (PV) array to a DC energy storage source.

BACKGROUND

Photovoltaic (PV) power generation systems are power systems that employ a plurality of solar modules to convert sunlight into electricity. PV systems include multiple components, including photovoltaic modules, mechanical and electrical connections and mountings, and signal conditioners for regulating or modifying the electrical output. In some examples, several PV modules are connected in series to form a PV string, with multiple PV strings in a PV system then being combined in parallel to aggregate the current in a PV array. PV cells generate direct current (DC) power, with the level of DC power being dependent on solar irradiation and the level of DC voltage dependent on temperature. When alternating current (AC) power is desired, an inverter is used to convert the DC power into AC power, such as AC power suitable for transfer to a power grid.

PV power systems have a complex relationship between their operating environment and the maximum power they can produce. A Fill Factor (FF) is a parameter that characterizes a non-linear electrical behavior of a solar cell of the PV power system. The FF is defined as the ratio of the maximum power from the solar cell to the product of Open Circuit Voltage ($V_{OC}$) and Short-Circuit Current ($I_{SC}$). In tabulated data, the FF is employed to estimate the maximum power that a PV cell can provide with an optimal load under given conditions.

SUMMARY

One example relates to a power generation and storage system that includes a wind turbine and a doubly-fed induction generator connected to the wind turbine and to a power grid. One or more DC energy sources are coupled to the doubly-fed induction generator and to the power grid. A programmable AC-DC converter has an input connected to a rotor of the doubly-fed induction generator and an output connected to the one or more DC energy sources and to the power grid. A controller programs the output of the programmable AC-DC converter to produce a variable DC output voltage at a DC junction. Power distributed to the power grid from the doubly-fed induction generator and the one or more DC energy sources is proportioned based on at least the variable DC output voltage at the DC junction.

Another example relates to a power generation and storage system that includes a wind turbine and a doubly-fed induction generator connected to the wind turbine and selectively coupled to a power grid. A photovoltaic array is coupled to the power grid and a DC energy storage source is coupled to the doubly-fed induction generator, the photovoltaic array, and the power grid. The DC energy storage source stores power from at least one of the doubly-fed induction generator and the photovoltaic array. A controller selectively connects at least one of the doubly-fed induction generator and the photovoltaic array to the DC energy storage source in response to determining that a maximum supplied generated power meets a selectable grid limit.

Still another example relates to a method that includes a method that includes determining a selectable grid limit of a power grid and programming a programmable AC-DC converter to output a DC voltage to a DC junction. A state of charge of a DC energy storage source and an effective output voltage of a photovoltaic array are determined. Power is distributed to the power grid from at least one of a wind turbine via a doubly-fed induction generator, and the DC energy storage source and the photovoltaic array via a DC-AC inverter based on the DC voltage at the DC junction. Power is stored in the DC energy storage source from the at least one of the wind turbine and the photovoltaic array if a maximum supplied generated power meets the selectable grid limit.

DETAILED DESCRIPTION

The present disclosure is related to systems and methods for controlling the operation of a power generation and storage system. The power generation and storage system includes a wind turbine and a photovoltaic (PV) array both of which are disconnectedly coupled to a power grid. The power generation and storage system also includes a direct current (DC) energy storage source (e.g., a battery or other DC energy storage source) disconnectedly coupled to the wind turbine, the PV array, and the power grid. Under certain operating conditions as explained below, the wind turbine via doubly-fed induction generator (DFIG) and/or the PV array and/or the DC energy storage source can supply power to the power grid. In other operating conditions, any excess power generated by the wind turbine and/or the PV array can be stored in the DC energy storage that can be supplied to the power grid when the wind turbine and/or the PV array are unavailable.

In one example, a controller of the power generation system electrically connects the PV array to the DC energy storage source in response to determining that an output power of an inverter meets a selectable grid limit. In such a situation, the controller adjusts an effective output voltage of the PV array based on open circuit voltage and a charging voltage of the DC energy storage source in a manner described herein. In this manner, the power generation system concurrently charges the DC energy storage source and provides power to the power grid. Moreover, by carefully adjusting the effective output voltage of the PV array, over charging of the DC energy storage source is prevented. Additionally, since the PV array is electrically connected to the DC energy storage source (directly), the power generation system avoids (obviates) the need for a separate inverter and/or DC-DC converter for charging of the DC energy storage source.

Figure 1:
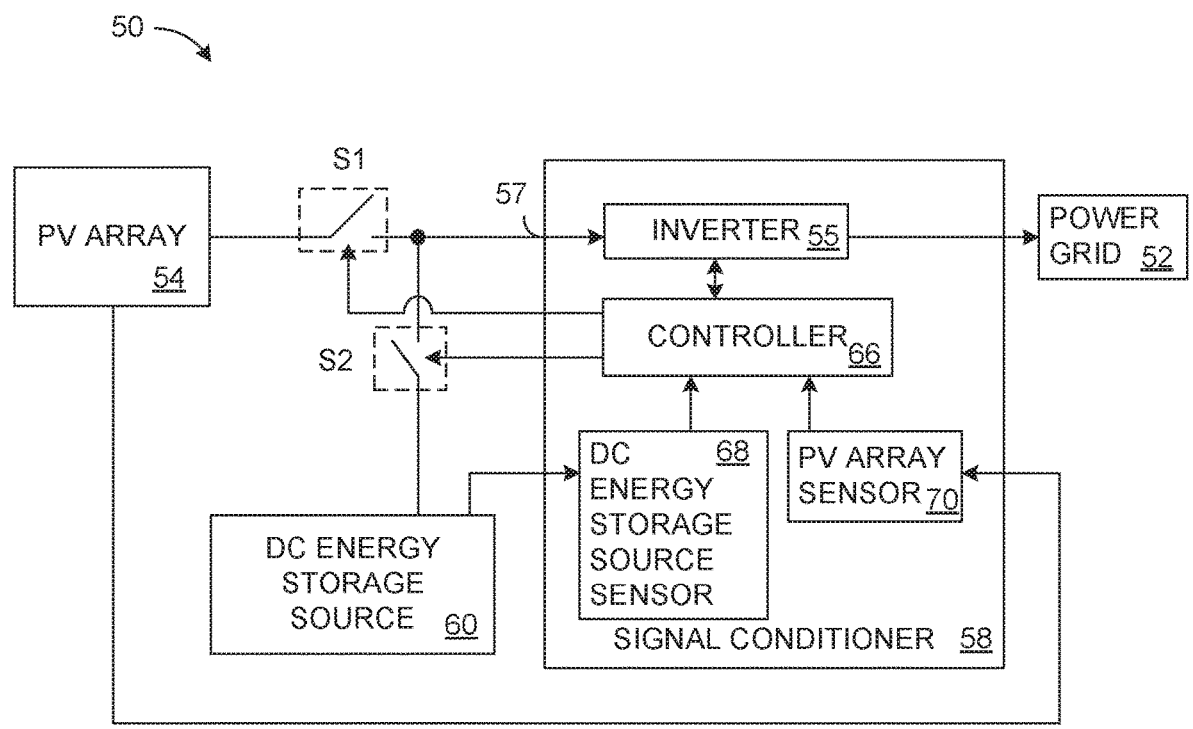
FIG. 1 illustrates an example of a power generation system.

FIG. 1 illustrates an example of a power generation system 50 that is configured to provide alternating current (AC) power (energy) to a power grid 52. The power generation system 50 includes a PV array 54. The PV array 54 is representative of multiple PV cells operating in concert. In particular, the PV array 54 may include any number of PV array groups, with each PV array group being configured to generate a DC power in response to solar irradiation. Each PV group includes one or more PV strings with each of the PV string including multiple PV cells (modules) coupled in series. It is appreciated that the number of PV groups and/or the number of PV strings can vary, with one, two, three, or four or more PV strings being included in each PV group, for example. Alternatively, the PV array 54 may be a single PV module.

The PV array 54 is disconnectedly coupled to an inverter 55 of a signal conditioner 58 via a first switch, S1 at an input 57 of the inverter 55. As used herein, the term "disconnectedly coupled" indicates that two nodes (e.g., an output of one element and an input of another element) can be switchably coupled and de-coupled via a switch. The power generation system 50 also includes a DC energy storage source 60 that is disconnectedly coupled to the input 57 of the inverter 55 via a second switch, S2. The DC energy storage source 60 could be representative of a single battery, multiple batteries coupled as a battery bank or an alternative form of a DC power source, such as but not limited to fly wheels and/or flow batteries. In some examples, the DC energy storage source 60 can be implemented as a lithium ion battery or an array of lithium ion batteries. As some other non-limiting examples, the DC energy storage source 60 could be formed of nickel metal hydride battery cells, nickel cadmium battery cells, lead-acid battery cells, or nearly any type of chemical battery.

The inverter 55 of the signal conditioner 58 converts DC signals into an AC signal for distribution on the power grid 52. The signal conditioner 58 includes a controller 66 that controls operations of the inverter 55 and/or other internal/external components, as discussed herein. In commercially available examples, the signal conditioner 58 may be referred to as the "inverter". Additionally, it is understood that in some examples, a subset (or all) of the constituent components of the signal conditioner 58 can be implemented on disparate (separate) components.

The PV array 54 is also coupled to a PV array sensor 70 of the signal conditioner 58. The PV array sensor 70 measures characteristics of a signal output by the PV array 54 (e.g., a voltage and current). The PV array 54 provides substantially real-time (e.g., within about 5 seconds) PV data characterizing the measured signal to the controller 66. Similarly, the DC energy storage source 60 is coupled to a DC energy storage sensor 68 that measures characteristics of the DC energy storage source 60 (e.g., voltage, current and impedance). The DC energy storage sensor 68 provides substantially real-time (e.g., within about 5 seconds) DC energy storage data to the controller 66 that characterizes the properties measured by the DC energy storage sensor 68.

The controller 66 controls an opening and closing of the first switch S1 and the second switch S2. The first switch S1 and the second switch S2 could be implemented as solid-state switches (e.g., transistors) or electromechanical switches (e.g., relays). Moreover, although the first switch, S1 and the second switch S2 are illustrated as being external to the signal conditioner 58, it is understood that in some examples, the first switch S1 and/or the second switch S2 could be internal to the signal conditioner 58.

The inverter 55 has a maximum power rating and/or a contracting limit that characterizes a maximum amount of power that the inverter 55 can deliver to the power grid 52, which maximum power can be referred to as a maximum inverter power. The PV array 54 also has a maximum power that is deliverable to the inverter 55, which maximum power is referred to as the maximum PV power. The maximum PV power is the highest power the PV array 54 outputs in ideal conditions (e.g., full irradiance, relatively low temperature, etc.). To ensure that the PV array 54 saturates the inverter 55 at less than ideal conditions, the maximum PV power is greater than the maximum inverter power. In fact, in some examples, the maximum PV power is 1.5 times (or more) than the maximum inverter power. Additionally, the controller 66 can set a "selectable grid limit" that defines a configurable maximum amount of power that the inverter 55 supplies to the power grid 52 at a given time. The selectable grid limit can change over time, for example, as power needs on the power grid 52 change. The selectable grid limit has a power level that is less than or equal to the maximum inverter power. For instance, in one example, the selectable grid limit may be set to about 90% of the maximum inverter power. It is noted that the selectable grid limit can be changed manually (e.g., by an end-user) and/or automatically. The changes can be based on changes to the environment of operation of the power generation system 50 and/or the power grid 52. Further, the changes to the selectable grid limit can be based on financial considerations, such as a changing amount of financial credit for power applied to the power grid 52. Moreover, the list of reasons/use cases for changing the selectable grid limit is not meant to be exhaustive. It is understood that the grid limit can be changed at nearly any time for nearly any reason without limitation to nearly any level at or below the maximum inverter power.

The controller 66 can be representative of a computing device (or multiple computing devices), such as a programmable logic controller (PLC), a microcontroller, etc. The controller 66 is configured/programmed to control the inverter 55 and the switches S1 and S2 to change operating modes of the power generation system 50 based on operational characteristics of the PV array 54 and the DC energy storage source 60.

In a first mode of operation (hereinafter, "the first mode"), the controller 66 is configured to close the first switch S1 and open the second switch S2. In the first mode, the PV array 54 applies a voltage and current to the input 57 of the inverter 55, and the PV array sensor 70 measures the voltage and current of the PV array 54. Additionally, in the first mode, the controller 66 receives PV data characterizing the voltage and current output by the PV array sensor 70. The controller 66 executes a Maximum Power Transfer Point Tracking (MPPT) procedure to set a Maximum Power Point (MPP) of the PV array 54. In particular, during the MPPT procedure, the controller 66 can command the inverter 55 to change an input impedance (or other electrical property) that changes an effective (observed) output voltage of the PV array 54 at the input 57. Moreover, the inverter 55 provides substantially real-time (e.g., within about 5 seconds) feedback to the controller 66 indicating the amount of current, voltage and/or power output to the power grid 52. Thus, in the first mode, the PV array 54 supplies power to the power grid 52 via the inverter 55.

During operation in the first mode, the controller 66 monitors the current, voltage and/or power output by the inverter 55 to determine a point at which the inverter 55 reaches (climbs to) the selectable grid limit. As one example, the power generation system 50 operates in the first mode from a time of sunrise until the inverter 55 reaches the selectable grid limit. Upon detecting that the inverter 55 reached the selectable grid limit, the controller 66 switches to a second mode of operation (hereinafter "the second mode").

In the second mode, the controller 66 evaluates the voltage of the DC energy storage source 60 to determine an open circuit voltage of the DC energy storage source 60. The controller 66 can set the effective output voltage of the PV array 54 to substantially match the open circuit voltage of the DC energy storage source 60. Upon setting the effective voltage, the controller 66 closes the first switch S1 and the second switch S2. Thus, in the second mode, the PV array 54 and the DC energy storage source 60 are electrically coupled to the same electrical node, namely, the input 57 of the inverter 55. Additionally, the controller 66 monitors the DC energy storage data provided from the DC energy storage sensor 68 to determine a charging voltage of the DC energy storage source 60.

Moreover, the controller 66 causes the inverter 55 to set/adjust the effective output voltage of the PV array 54 to a level corresponding to the open circuit voltage of the DC energy storage source 60 plus the charging voltage. The charging voltage can vary based on the impedance and/or a desired charging current of the DC energy storage source 60, which level can be referred to as a power and charge voltage. The term "power and charge voltage" denotes an effective voltage level wherein the PV array 54 supplies DC power to the inverter 55 that is converted into AC power for the power grid 52 while concurrently charging the DC energy storage source 60. In a given example, (hereinafter, "the given example"), it is presumed that the controller 66 determines that if the PV array 54 has an effective output voltage of 1100 Volts (V) applied to the input 57 of the inverter 55, that the inverter 55 reaches the selectable grid limit. Additionally, in the given example, it is presumed that the DC energy storage source 60 has an open circuit voltage of about 900 V. Thus, in the given example, the controller 66 sets the effective output voltage of the PV array 54 to 900 V to substantially match the open circuit voltage of the DC energy storage source 60 and then closes the second switch, S2. Moreover, the controller 66 (relatively) slowly increases the effective output voltage of the PV array 54 from the open circuit voltage of the DC energy source and monitors a response output current in the DC energy storage source 60 until the desired charging current is reached. In the given example, it is presumed that the desired charging current is reached upon the effective output voltage of the PV array 54 being raised by about 10 V. Thus, in the given example, the controller 66 can set the power and charge voltage to about 910 V.

In the second mode, upon setting the power and charge voltage for the PV array 54, the PV array 54 supplies power to the power grid 52 (via the inverter 55) and charges the DC energy storage source 60 concurrently. This is possible in the second mode since the PV array 54 and the DC energy storage source 60 are coupled to a common node, namely the input 57 of the inverter 55. Additionally, setting the power and charge voltage to a level above the open circuit voltage of the DC energy storage source 60 causes the DC energy storage source 60 to "resist" the voltages above the open circuit voltage thereby absorbing the "excess" power, which charges the DC energy storage source 60. Continuing in the second mode, the controller 66 can adjust the power and charge voltage in response to detecting a change in the output of the DC energy storage source 60 (characterized in the DC energy storage data) and/or a change of output at the PV array (characterized in the PV data). In particular, in response to detecting an increase in the current of the DC energy storage source 60, the controller 66 can adjust the power and charge voltage at the inverter 55. Similarly, in response to a decrease in the current of the DC energy storage source 60, the controller 66 can adjust the power and charge voltage.

The controller 66 maintains the power generation system in the second mode until the DC energy storage source 60 is fully charged or the output power of the inverter 55 and/or the output voltage of the PV array 54 moves outside a threshold window. Alternatively, the controller 66 may detect that an effective voltage of the PV array 54 for charging the DC energy storage source 60 changes to a level that falls outside a voltage range that is allowable by the DC energy storage source 60 and/or the inverter 55. In any such situation, the controller 66 can switch the power generation system 50 to the first mode. Additionally or alternatively, the controller 66 can switch the power generation system 50 to the first mode in response to detecting a relatively steep decrease in a rate of power output by the inverter 55, which could indicate the presence of a temporary weather element (e.g., a cloud). In this situation, the controller 66 may switch to the first mode to avoid damaging the DC energy storage source 60. In yet other examples, the controller 66 can switch the power generation system 50 to the first mode in response to a command from another computing device and/or in response to user input. To switch the power generation system 50 back to the first mode, the controller 66 can be configured to open the second switch, S2. In response to the controller 66 detecting a PV output voltage that is favorable to charging of the DC energy storage source 60, the controller 66 can switch the power generation system 50 back to the second mode. This process of switching between the first mode and the second mode can be repeated multiple times throughout daylight hours. For example, weather conditions such as clouds, air temperature, rain, etc. may cause a drop in the output voltage of the PV array 54 that causes the controller 66 to temporarily switch the power generation system 50 to the first mode.

It is noted that the second mode, in some examples, the DC energy storage source 60 can discharge, such that the PV array 54 and the DC energy storage source 60 can concurrently provide output power to the inverter 55 that is converted to AC power for the power grid 52. For example, during operation in the second mode in some situations, the controller 66 can set the effective voltage of the PV array 54 to a level below the open circuit voltage of the DC energy storage source 60. In such a situation, the DC energy storage source 60 "resists" the drop in voltage by discharging DC power to the inverter 55.

Additionally, the controller 66 can be configured to switch the power generation system 50 to a third mode of operation (hereinafter, "the third mode") at predefined times and/or in response to a set of conditions that may vary based on an environment of operation (e.g., energy and/or financial considerations). Additionally or alternatively, the controller 66 may be configured to switch the power generation system 50 to the third mode in response to detecting a relatively gradual rate of decline in the output voltage of the PV array 54 and/or based on a time of day. As one example, the controller 66 switches to the third mode, for example, near sunset. In the third mode, the controller 66 is configured to open the first switch S1 and close the second switch S2. In the third mode, the DC energy storage source 60 supplies an input voltage to the input of the inverter 55, and the inverter 55 supplies AC power to the power grid 52. Accordingly, in the third mode, the DC energy storage source 60 discharges and supplies power to the power grid 52 via the inverter 60.

In the third mode, the controller 66 monitors the output voltage and current of the DC energy storage source 60 to determine if a minimum state of charge (SOC) of the DC energy storage source 60 is reached. In some examples, the minimum SOC is a level at which the DC energy storage source 60 has been nearly completely discharged/depleted. Upon reaching the minimum SOC, the controller 66 can switch the power generation system 50 to the first mode.

By employing the power generation system 50, the PV array 54 can directly charge the DC energy storage source 60 while power is supplied to the power grid 52. Such a direct charge obviates the need for a separate inverter and/or a DC/DC converter for charging the DC energy storage source 60. Rather, in the second mode, the voltage applied by the PV array 54 to the DC energy storage source 60 is (tightly) controlled by adjusting the effective output voltage of the PV array 54 at the input 57 of the inverter 55. Such a control prevents application of an excessively large voltage that might damage or reduce the lifetime of the DC energy storage source 60 due to over-charging. In this manner, at times during a day where the PV array 54 is capable of providing more power than the inverter 55 can convert to AC power for the power grid 52 (set by the selectable grid limit), the "excess" power can be employed to charge the DC energy storage source 60.

Figure 2:
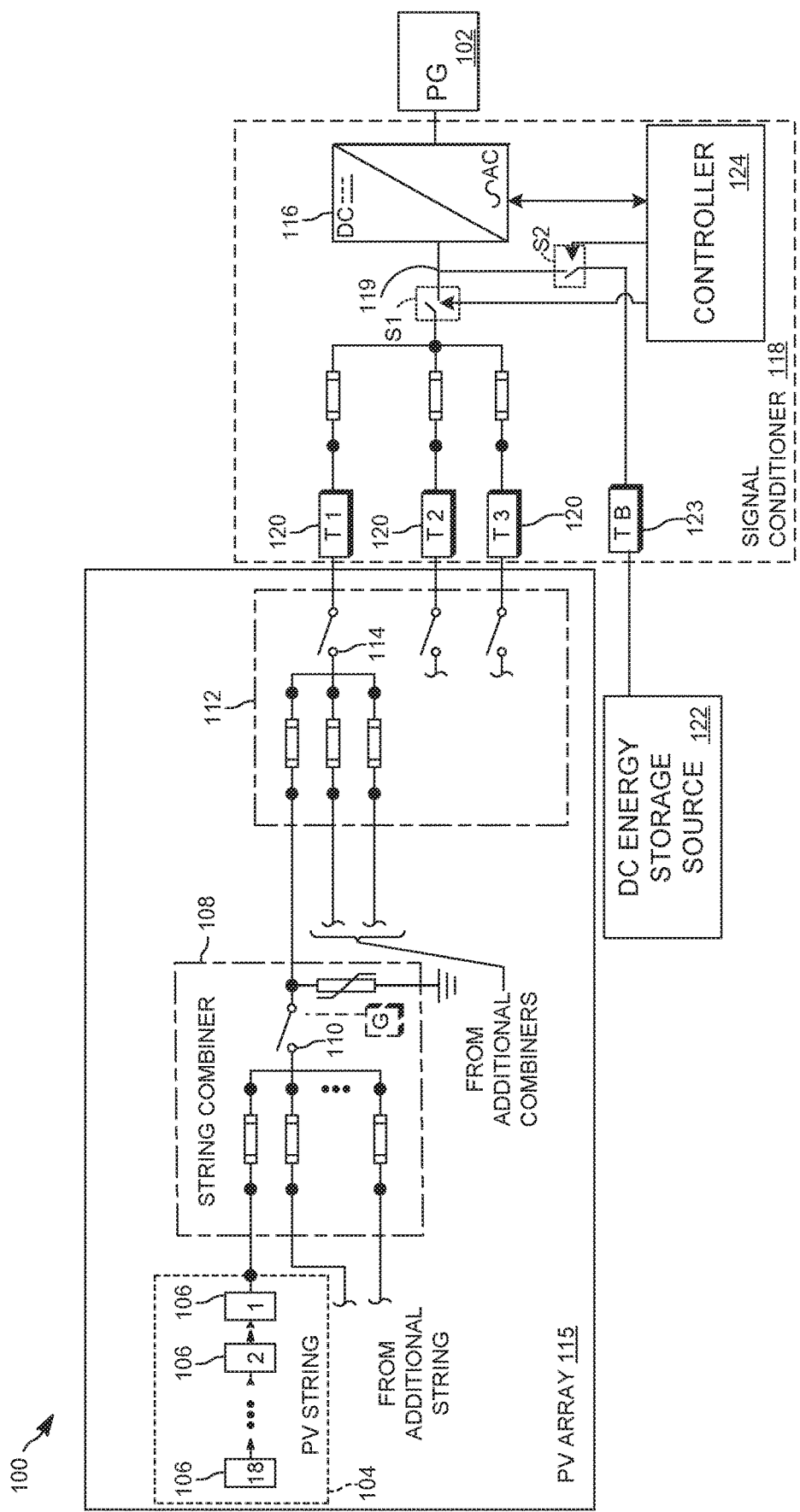
FIG. 2 illustrates another example of a power generation system.

FIG. 2 illustrates an example of an arrangement for a power generation system 100 to provide AC power to a power grid 102. It is noted that the arrangement in FIG. 2 is only one example of a possible arrangement, many similar or different arrangements are possible, as is appreciated by one of ordinary skill in the art. The power generation system 100 has B number of strings 104 of PV modules 106 connected in series, where B is an integer greater than or equal to one. In some examples, each of the B number of strings 104 can have the same number of PV modules 106 connected in series (e.g., 18). In this situation, each string 104 is configured to provide a maximum output of about 8 amperes (A) of current. In other examples, strings 104 can have different numbers of PV modules 106.

A set of strings 104 is coupled to an input of a string combiner 108. In some examples, three (3) strings 104 can be coupled to a common output node 110 of the string combiner 108. In other examples, there can be more or less strings 104 in the set of strings 104. Additionally, a set of string combiners 108 can be coupled to an input of a combiner box 112. In some examples, three (3) string combiners 108 are coupled to a common output node 114 of the combiner box 112. In other examples, more or less string combiners 108 can be in the set of string combiners 108. It is noted that the string combiners 108 and the combiner box 112 can collectively be referred to as a "combiner" in some examples. The strings 104, the string combiner 108 and the combiner box 112 (along with the constituent components) can be collectively be referred to as a PV array 115. The PV array 115 can be employed as one example to implement the PV array 54 of FIG. 1.

Each output of the combiner box 112 can be coupled to an inverter 116 of a signal conditioner 118 at an input 119. In the present example, it is presumed that there are R number of outputs of the combiner box 112, where R is an integer greater than or equal to one. The signal conditioner 118 can be employed for example, to implement the signal conditioner 58 of FIG. 1 (or some portion thereof). Additionally, R number of (current and voltage) transducers (T) 120 are coupled to the corresponding R number of outputs of the combiner box 112. Each transducer 120 can (passively) monitor a respective input signal provided to the inverter 116. Moreover, in some examples, each of the transducers 120 can be integrated with the inverter 116. In some examples, the set of transducers 120 can collectively be employed to implement the PV array sensor 70 of FIG. 1. Thus, the transducers 120 provide substantially real time data characterizing the output of the PV array 115, which can collectively be referred to as PV data.

Additionally, the power generation system 100 includes a DC energy storage source 122. The DC energy storage source 122 can be employed, for example to implement the DC energy storage source 60 of FIG. 1. The DC energy storage source 122 can represent a plurality of battery cells (or other DC source) coupled together to supply a voltage on the input 119 of the inverter 116. As one non-limiting example, the DC energy storage source 122 is formed of lithium ion battery cells. In other examples, the DC energy storage source 122 could be formed of nickel metal hydride battery cells, nickel cadmium battery cells, lead-acid battery cells, fly wheels, flow batteries, etc. A (current and voltage) transducer 123 monitors an input signal provided at the input 119 of the inverter 116. The transducer 123 can be employed to implement the DC energy storage sensor 68 of FIG. 1.

A first switch S1 is coupled between the input 119 and the output of the PV array 115. A second switch S2 is coupled between the DC energy storage source 122 and the input 119 of the inverter 116. A controller 124 of the signal conditioner 118 controls a state of the first switch, S1 and the second switch S2. In this manner, the PV array 115 and the DC energy storage source 122 are disconnectedly coupled to the input 119 of the inverter 116 and to each other. The controller 124 is implemented as a computing device (or multiple computing devices), such as a PLC or a microcontroller that executes machine-readable instructions. The controller 124 has a non-transitory machine-readable medium that stores the machine-readable instructions that (when executed) control operations of the power generation system 100.

The controller 124 receives signals from the current and voltage transducers 120 that (collectively) characterize PV data, which includes an output voltage and current of the PV array 115. Similarly, the controller 124 receives signals from the transducer 123 that characterizes DC energy storage data for the DC energy storage source 122. The DC energy storage data characterizes an output voltage, current and/or impedance of the DC energy storage source 122.

Similar to the power generation system 50 of FIG. 1, the power generation system 100 can operate in a first mode, wherein the first switch S1 is closed and the second switch S2 is opened. In the first mode, the controller 124 executes an MPPT (Maximum Power Point Tracking) procedure to identify and set the MPP of the PV array 115.

To execute the MPPT procedure, the controller 124 sets an effective output voltage of the PV array 115 at the inverter 116. In particular, to change the effective output voltage of the PV array 115, the controller 124 can change an input impedance of the inverter 116 at the input 119. Additionally, the controller 124 receives a feedback signal from the inverter 116 characterizing an input current to the input 119 and an output power of the inverter 116. It is understood that in other examples, more or less data may be provided in the feedback to the controller 124. The controller 124 adjusts (increases and decreases) the effective output voltage of the PV array 115 until the MPP (Maximum Power Point) is determined. Additionally, the MPP changes over time, and the MPPT procedure updates periodically (e.g., about every 10 minutes) and/or asynchronously (e.g., in response to a drop in output power) to determine an updated MPP.

Figure 3:
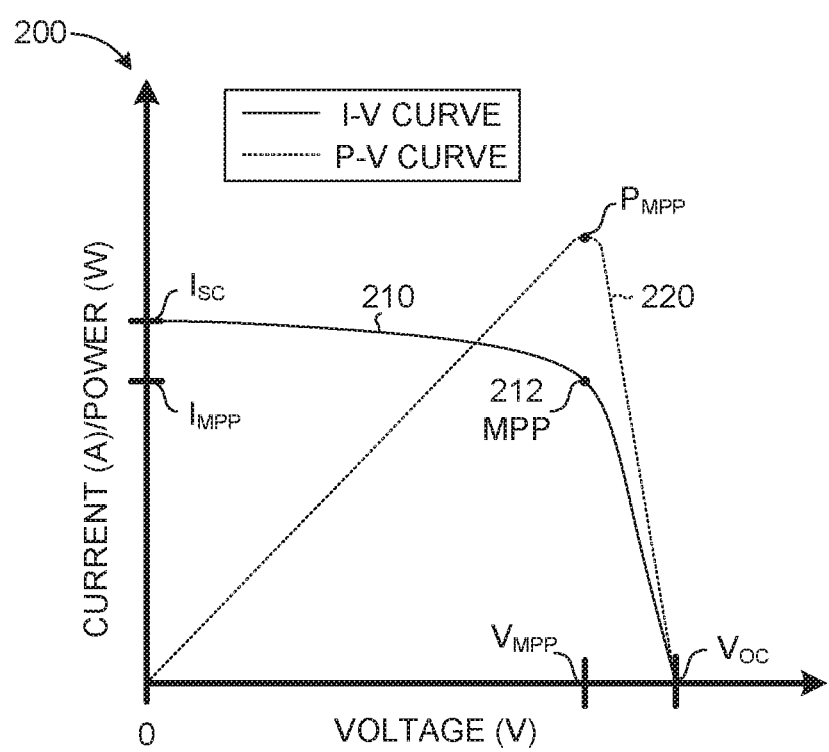
FIG. 3 illustrates a diagram for determining a maximum power point of a photovoltaic array.

FIG. 3 illustrates a chart 200 that demonstrates the MPPT procedure. The chart 200 includes a current-voltage (I-V) plot 210 that plots input current as a function effective output voltage. The plot 210 represents an example of a current, in amperes (A) provided to the inverter 116 at the input 119 as a function of the effective output voltage, in volts (V) of the PV array 115 of FIG. 2. Additionally, the chart 200 includes a power-voltage (P-V) plot 220 that represents an example of an output power, in Watts (W) plotted as a function of the effective output voltage (in V). The plot 220 represents an example of an output power by the inverter 116 as a function of the effective output voltage applied by the PV array 115 at the input 119 of the inverter 116.

As illustrated by the plot 210, the current decreases from a short circuit current, $I_{SC}$ to about 0 A as the effective output voltage of the PV array 115 increases from about 0 V (a short circuit) to an open circuit voltage, $V_{OC}$. Moreover, as illustrated by the plot 220, the output power increases from about 0 W to a Power maximum power point ($P_{MPP}$) as the effective output voltage increases from about 0 to a voltage maximum power point ($V_{MPP}$). Additionally, the output power decreases from the $P_{MPP}$ to about 0 W as the voltage increases from the $V_{MPP}$ to $V_{OC}$.

During the MPPT procedure, the effective output voltage of the PV array 115 is increased and decreased to determine an effect on the output power. In particular, the effective output voltage (e.g., the effective output voltage of the PV array 115) is increased and decreased until the $P_{MPP}$ and the $V_{MPP}$ are identified. Upon identification of the $V_{MPP}$, a current maximum power point, $I_{MPP}$ is also determined/identified, as indicated by the plot 210. A controller (e.g., the controller 124) sets the effective output voltage of the $V_{MPP}$, which induces a current at the $I_{MPP}$ and results in the MPP 212 on the I-V plot 210. As illustrated by the chart 200, the $P_{MPP}$ and the MPP are positioned on the same point of the voltage axis. Thus, setting the effective output voltage to the $V_{MPP}$, induces the $I_{MPP}$, which results in MPP and $P_{MPP}$.

Referring back to FIG. 2, the inverter 116 has a maximum inverter power that characterizes a maximum amount of power (corresponding to a maximum power rating and/or a contracting limit) the inverter 116 can deliver to the power grid 102. Similarly, the PV array 115 also has a maximum PV power. To ensure the PV array 115 saturates the inverter 116 at less than ideal conditions, the maximum PV power is greater than the maximum inverter power. In fact, in some examples, the maximum PV power is about 1.5 times (or more) than the maximum inverter power. Additionally, the controller 124 can set a selectable grid limit that defines a configurable maximum amount of power that the inverter 116 supplies to the power grid 102 at a given time. The selectable grid limit can change over time, for example, as the power needs on the power grid 102 change and/or changed as desired based on operational conditions of the power generation system 100 and/or the power grid 102. Further, the selectable grid limit can change based on financial considerations. In fact, as noted herein, the selectable grid limit can change for nearly any reason at nearly any time. The selectable grid limit could be set to a power level that is less than or equal to the maximum inverter power. For instance, in one example, the selectable grid limit may be 95% of the maximum inverter power.

In the first mode, the PV array 115 generates power that is provided to the power grid 102 via the inverter 116. During operation in the first mode, the controller 124 monitors the effective output voltage of the PV array 115, the current applied at the input 119 and/or the power output by the inverter 116 to determine a voltage at which the inverter 116 reaches the selectable grid limit. This voltage can be referred to as a selectable grid limit voltage, $V_{GL}(t)$. The selectable grid limit voltage, $V_{GL}(t)$ can change a function of the selectable grid limit. As one example, the power generation system 100 operates in the first mode from a time of sunrise and/or a time of (nearly) complete discharge of the DC energy storage source 122 until the inverter 116 reaches the selectable grid limit. Upon detecting that the inverter 116 has reached the selectable grid limit, similar to the power generation system 50 of FIG. 1, the controller 124 switches the power generation system 100 to a second mode.

In the second mode, the controller 124 monitors the DC energy storage data to determine an open circuit voltage of the DC energy storage source 122. The controller 124 sets the effective output voltage of the PV array 115 to substantially match the open circuit voltage of the DC energy storage source 122. Upon such matching, in the second mode, the controller 124 closes (or keeps closed) the first switch, S1 and the second switch S2. Thus, in the second mode, the PV array 115 and the DC energy storage source 122 are electrically coupled to the same electrical node, namely, the input 119 of the inverter 116. Additionally, the controller 124 determines a charging voltage, $V_{DC\_CH}$ of the DC energy storage source 122. The charging voltage may be predetermined and/or may be based on a measured output voltage, current and/or impedance of the DC energy storage source 122 characterized in the DC energy storage data.

In the second mode, the controller 124 commands the inverter 116 to (slowly and incrementally) increase the effective output voltage of the PV array 115 from the open circuit voltage of the DC energy storage source 122 to a level that corresponds to a power and charge voltage, $V_{PC}$. The power and charge voltage, $V_{PC}$ can be approximated by Equations 1 and 2.

$$V_{PC}(t) \approx V_{OC} + V_{DC\_CH}(t) \qquad \text{Equation 1}$$

$$V_{DC\_CH}(t) = I_D(t) R(t) \qquad \text{Equation 2}$$

Wherein:

$V_{PC}(t)$ is the power and charge voltage as a function of time;

$V_{OC}$ is the open circuit voltage of the DC energy storage source 122;

$V_{DC\_CH}(t)$ is the charging voltage of the DC energy storage source 122;

$I_D(t)$ is a desired charging current of the DC energy storage source 122 as a function of time; and $R(t)$ is the input impedance of the DC energy storage source as a function of time.

The desired charging current, $I_D$, which changes as a function of time, is based on a charging current limit, $I_L$ of the DC energy storage source 122. The charging current limit can be a maximum safe charging current employable by the DC energy storage source 122. The desired charging current, $I_D$ can be set (by the controller 124) to a current that is less than or equal to the charging current limit, $I_L$ of the DC energy storage source 122. The desired charging current, $I_D$ can be less than the charging current limit, $I_L$ in examples where a specific charging rate of the DC energy storage source 122 is needed. Additionally, the desired charging current, $I_D$ might be set to a level less than the charging current limit, $I_L$ to improve a (battery) lifetime of the DC energy storage source 122. It is to be appreciated that there are many other reasons that the desired charging current, $I_D$ might be set to a level less than the charging current limit, $I_L$.

The power and charge voltage, $V_{PC}$ is a dynamic value that changes as the charging voltage, $V_{DC\_CH}(t)$ and/or the selectable grid limit changes over the time, t. In another given example (hereinafter, "the other example"), it is presumed that if the PV array 115 applies an effective output voltage of about 900 V to the input 119 of the inverter 116, that the inverter 116 reaches the selectable grid limit at a given time. Further, it is presumed that the DC energy storage source 122 has an open circuit voltage of about 850 V when the inverter 116 reaches the selectable grid limit. Additionally, in the other example, it is presumed that the charging voltage, $V_{DC\_CH}$ for the DC energy storage source 122 is 23 V at the given time. Thus, in the other example, the controller 124 initially sets the effective voltage of the PV array 115 to match the DC charging voltage of the DC energy storage source 122 (850 V in the other example) and then closes the second switch, S2. Additionally, the controller 124 gradually raises the effective voltage of the PV array 115 and measures a response current. Upon detecting that the desired current of the DC energy storage source 122 is reached, the controller 124 sets the effective output voltage of the PV array 124 to the power and charge voltage, $V_{PC}$, which is about 873 V in the other example. Moreover, the controller 124 employs closed loop feedback to adjust the power and charge voltage $V_{PC}$ over time as the charging voltage, $V_{DC\_CH}$ and/or the selectable grid limit changes over time.

In the second mode, upon setting the power and charge voltage, $V_{PC}(t)$, the PV array 115 supplies power to the power grid 102 (via the inverter 116) and charges the DC energy storage source 122 concurrently. That is, the PV array 115 charges the DC energy storage source 122 directly since the PV array 115 and the DC energy storage source 122 are coupled to a common node (the input 119 of the inverter 116). In the second mode, the DC energy storage source 122 "resists" the increase of voltage over the open circuit voltage $V_{OC}$, and absorbs excess voltage/current to charge the DC energy storage source 122. That is, since the inverter 116 has reached the selectable grid limit for power provided to the power grid 102, the inverter 116 does not absorb current from the PV array 115 greater than a current at the selectable grid limit voltage, $V_{GL}(t)$. This current is (instead) stored in the DC energy storage source 122, thereby charging the DC energy storage source 122 directly from the PV array 115.

Additionally, in the second mode, the controller 124 continues to update the power and charge voltage, $V_{PC}(t)$ in response to determining a change in the charging voltage, $V_{DC\_CH}(t)$ for the DC energy storage source 122 and/or the selectable grid limit voltage, $V_{GL}(t)$. In particular, in response to detecting an increase in the DC energy storage source 122 current, causing an increase of the charging voltage, $V_{DC\_CH}$ of the DC energy storage source 122 (indicating that the DC energy storage source 122 has increased the stored charge) for a particular time, the controller 124 increases the power and charge voltage, $V_{PC}$ at the particular time. Conversely, in response to detecting a decrease in the DC energy storage source current causing a decrease in the charging voltage, $V_{DC\_CH}$ (indicating that the DC energy storage source 122 is discharging) at a particular time, the controller 124 decreases the power and charge voltage, $V_{PC}$ at the particular time. In this manner, the controller 124 employs closed loop feedback to concurrently charge the DC energy storage source 122 and provide power to the power grid 102.

The controller 124 maintains the power generation system 100 in the second mode until (for example) the controller 124 receives a command to stop operations in the second mode or detects that the DC energy storage source 122 is fully charged. In some examples, the controller 124 may detect that an output voltage of the PV array 115 drops below a threshold level. Alternatively, the controller 124 may detect that the inverter 116 is unable to maintain an effective output voltage for the PV array 115 to charge the DC energy storage source 122 that is within a range allowable by the inverter 116 and/or the DC energy storage source 122. In any such situation, the controller 124 can switch the power generation system 100 to the first mode. Additionally or alternatively, the controller 124 can switch the power generation system 100 to the first mode in response to detecting a relative steep rate of decline in the output power of the inverter 116, which can indicate the presence of a weather element (e.g., a cloud). In the first mode, the controller 124 opens the second switch S2 to disconnect the DC energy storage source 122 from the input 119 of the inverter 116 and from further charging by the PV array 115. Moreover, if the controller 124 detects favorable conditions for charging the DC energy storage source 122 have been restored, the controller 124 switches the power generation system 100 back to the second mode. The process of switching between the first mode and the second mode may be repeated multiple times throughout daylight hours. For instance, the presence of temporary weather elements, such as, but not limited to, temperature changes, clouds, rain, etc. may result in a relatively steep drop in the output voltage of the PV array 115 that causes the inverter 116 to temporarily drop the output power. In turn, the controller 124 temporarily switches the power generation system 100 to the first mode.

Further, it is noted that in some examples, the controller 124 can lower the effective output voltage of the PV array 115 to a level below the open circuit voltage, $V_{OC}$, which causes the DC energy storage source 122 to discharge to "resist" the change in voltage. In this situation, the PV array 115 and the DC energy storage source 122 concurrently provide DC power to the inverter 116 that is converted into AC power for the grid 102.

Additionally, after the output power of the inverter 116 drops gradually (indicating a sunset), the controller 124 is configured to switch the power generation system 100 to a third mode similar to the third mode explained with respect to FIG. 1. Additionally or alternatively, the controller 124 may switch to the third mode based on a time of day. The controller 124 switches to the third mode, for example, near sunset. In the third mode, the controller 124 opens (or keeps open) the first switch S1 and closes (or keeps closed) the second switch S2. In the third mode, the DC energy storage source 122 supplies an input voltage to the input 119 of the inverter 116, and the inverter supplies AC power to the power grid 102. Accordingly, in the third mode, the DC energy storage source 122 discharges and supplies power to the power grid 102 via the inverter 116.

In the third mode, the controller 124 monitors the output voltage and current of the DC energy storage source 122 to determine if a minimum SOC of the DC energy storage source 122 is reached. In some examples, the minimum SOC is a level at which the DC energy storage source 122 has been nearly completely discharged (depleted). Upon reaching the minimum SOC, the controller 124 can switch the power generation system 100 to the first mode.

Figure 4:
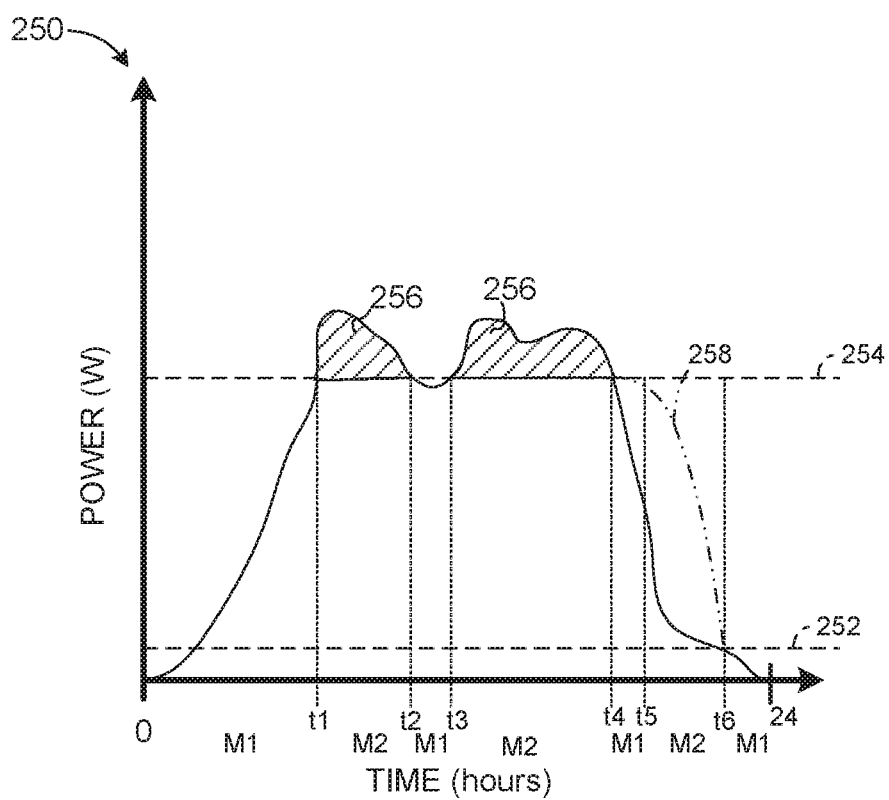
FIG. 4 illustrates a diagram of an output of an inverter plotted as a function of time.

FIG. 4 illustrates an example of a chart 250 that plots an output power in Watts (W) of the inverter 116 as a function of time, in hours, over the course of a full day (24 hours). Additionally, the chart 250 includes a minimum power level 252 (corresponding to a minimum SOC of DC energy storage source 122) and a selectable grid limit 254. For purposes of simplification of explanation, it is presumed that the selectable grid limit 254 is static, but as explained, the selectable grid limit (in some examples) could change as a function of time.

Additionally, the chart 250 denotes times that the power generation system 150 switches between the first mode ("M1" in FIG. 4), the second mode ("M2" in FIG. 4) and the third mode ("M3 in FIG. 4"). As demonstrated, in the example illustrated by the chart 250, between a time of about sunrise (time '0') until time t1, the power generation system 100 operates in the first mode, M1. Additionally, between times t1 and t2, the power generation system 100 operates in the second mode, M2. In the second mode, power exceeding the selectable grid limit 254 is employed to charge the DC energy storage source 122, which excess power is illustrated by shaded regions 256.

Further, between times t2 and t3, the output power temporarily drops (relatively steeply) below the selectable grid limit 254, and the power generation system 100 returns to the first mode, M1. Upon the output power being restored to the selectable grid limit 254, the power generation system 100 returns to the second mode, M2. Similarly, between times t4 and t5, the power generation system 100 switches to the first mode, M1. However, due to the time of day (e.g., near sunset), the output power gradually decreases between time t4 and t5, and the power generation system 100 switches to the third mode. In the third mode, DC energy storage source power denoted by a plot 258 is provided to the grid via the inverter 116. The power generation system then switches back to the first mode, M1 at time, t6 wherein the DC energy storage source 122 is depleted.

Referring back to FIG. 2, as an alternative, the controller 124 can be programmed to operate in the second mode to maximize a charging of the DC energy storage source 122. In particular, the controller 124 can (nearly) continuously adjust the selectable grid limit and the resultant power and charge voltage, $V_{PC}(t)$ to increase charging time. This approach may be desirable, for example, in situations where the power needs of the power grid 102 and/or financial credit for providing power to the power grid 102 change over time. Accordingly, in such a situation, the DC energy storage source 122 can be charged at times where demand and/or financial credit for power at the power grid 102 is low and stored for later delivery with a higher demand and/or higher financial credit.

Figure 5:
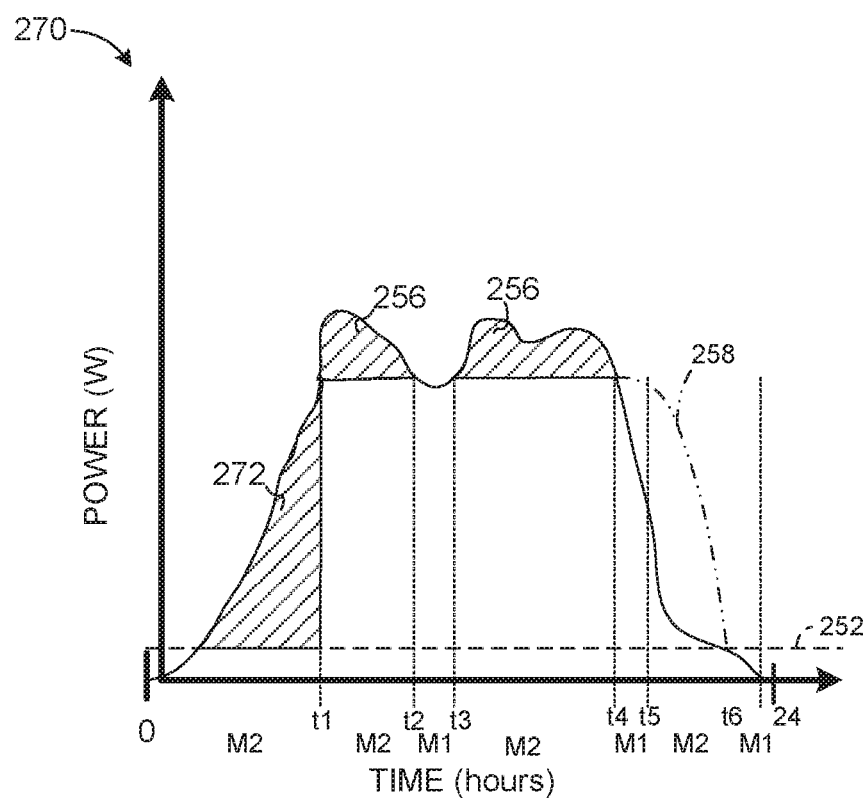
FIG. 5 illustrates another diagram of an output of an inverter plotted as a function of time.

FIG. 5 illustrates a graph 270 wherein DC energy storage source charging time is increased relative to the chart 250 illustrated in FIG. 4. For purposes of simplification of explanation, FIGS. 4 and 5 employ the same reference numbers to denote the same structure. Throughout the time illustrated in the graph 270 (24 hours), the selectable grid limit and corresponding power and charge voltage $V_{PC}(t)$ change as a function of time. In the graph 270, between time 0 and time t1, the the power generation system 100 operates in the second mode, adding an additional region 272 of excess power that is employed to charge the DC energy storage source 122. To add the additional region 272, the selectable grid limit can be dynamically lowered to a level slightly below the MPP of the PV array 15 to a level corresponding to the power and charge voltage, $V_{PC}$.

Referring back to FIG. 2, by employing the power generation system 100, the PV array 115 can directly charge the DC energy storage source 122 while concurrently supplying power to the power grid 102. This direct charge of the DC energy storage source 122 obviates the need for a separate inverter and/or DC-DC converter for the DC energy storage source 122. Instead, as explained, in the second mode, the effective output voltage of the PV array 115 is controlled by the controller 124 at the input 119 of the inverter 116 to prevent an application of an excessively large voltage that might damage or reduce the lifetime of the DC energy storage source 122. In this manner, at times of the day that the PV array 115 is capable of providing more power to the power grid 102 than the selectable grid limit allows, the excess power can be employed to charge the DC energy storage source 122.

Figure 6:
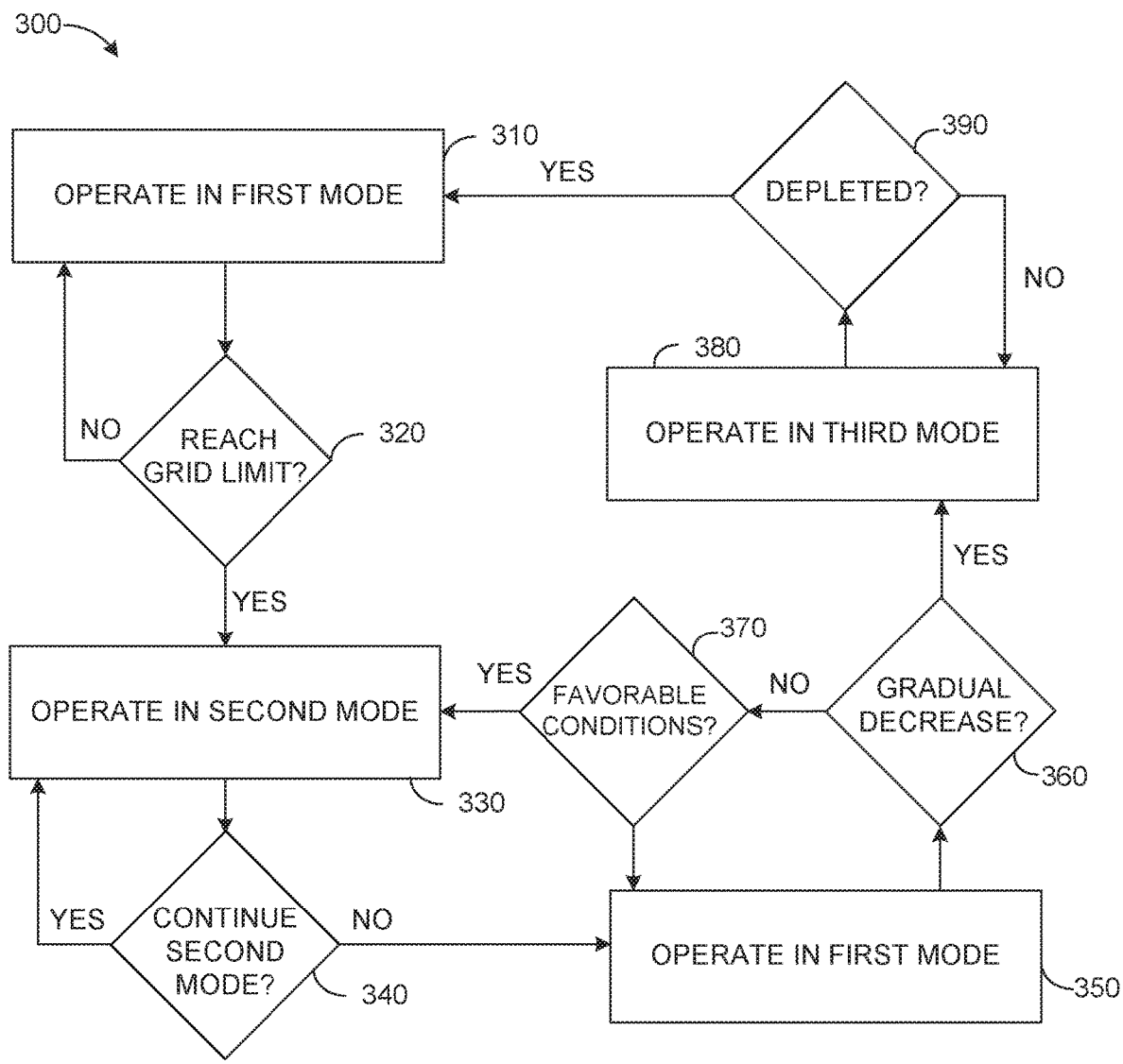
FIG. 6 illustrates a flowchart of an example method for controlling a power generation system.
Figure 7:
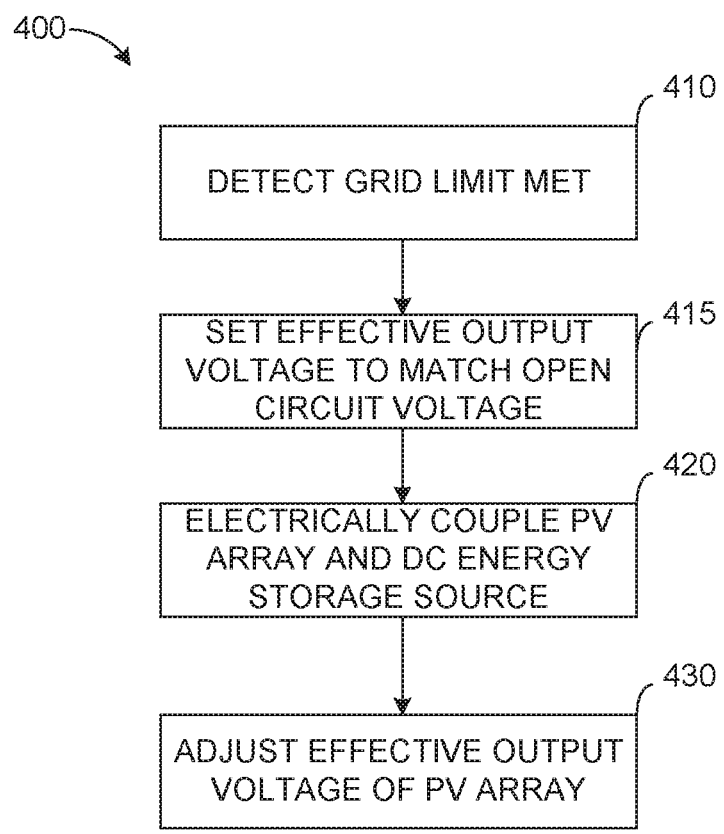
FIG. 7 illustrates another flowchart of an example method for controlling a power generation system.

In view of the foregoing structural and functional features described above, example methods will be better appreciated with reference to FIGS. 6 and 7. While, for purposes of simplicity of explanation, the example methods of FIGS. 6 and 7 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example methods of FIGS. 6 and 7 can be implemented as instructions stored in a non-transitory machine-readable medium. The instructions can be accessed by a processing resource (e.g., one or more processor cores) and executed to perform the methods disclosed herein.

FIG. 6 illustrates a flowchart of an example method 300 for controlling a power generation system that provides power to a power grid, such as the power generation system 50 of FIG. 1 and/or the power generation system 100 of FIG.

2. The method 300 could be implemented, for example by a controller, such as the controller 66 of FIG. 1 and/or the controller 124 of FIG. 2.

At 310, the controller operates the power generation system in a first mode. As described herein, in the first mode, the controller closes a first switch S1 (illustrated in FIGS. 1 and 2) to electrically couple a PV array (e.g., the PV array 54 of FIG. 1) to an input of an inverter (e.g., the inverter 55 of FIG. 1) and opens a second switch S2 (illustrated in FIGS. 1 and 2) that decouples a DC energy storage source (e.g., the DC energy storage source 60 of FIG. 1) from the input of the inverter. Additionally, in the first mode, the controller executes an MPPT procedure to determine the MPP for the PV array. At 320, a determination is made as to whether a selectable grid limit has been reached. If the determination at 320 is positive (e.g., YES), the method 300 proceeds to 330. If the determination at 320 is negative (e.g., NO), the method 300 returns to 310.

At 330, the controller operates the power generation system in a second mode. In the second mode, the controller sets a voltage of the PV array to an open circuit voltage of the DC energy storage source and then the controller closes (or keeps closed) the first switch S1 and closes the second switch. In the second mode, the DC energy storage source and the PV array are electrically coupled to the input of the inverter. Moreover, the controller adjusts a power and charge voltage (e.g., $V_{PC}(t)$ of Equation 1) to provide power to the grid and charge the DC energy storage source concurrently. At 340, a determination is made as to whether the power generation system should continue to operate in the second mode based on operating conditions of the power generation system or other conditions (as explained herein). If the determination at 340 is positive (e.g., YES), the method 300 returns to 330. If the determination at 340 is negative (e.g., NO), the method proceeds to 350.

At 350, the controller operates the power generation system in the first mode and can re-execute the MPPT procedure. At 360, a determination is made as to whether a gradual decrease in output power of the inverter (e.g., indicating a sunset) is detected. If the determination at 360 is negative (e.g., NO), the method proceeds to 370. If the determination at 360 is positive (e.g., YES), the method proceeds to 380.

At 370, a determination is made as to whether favorable conditions for charging the DC energy power source have been restored. If the determination at 370 is negative (e.g., NO), the method 300 returns to 350. If the determination at 370 is positive (e.g., YES), the method 300 returns to 330.

At 380, the controller operates the power generation system in a third mode. In the third mode, the controller opens the first switch S1 and closes the second switch S2. Thus, in the third mode, the DC energy storage source is coupled to the input of the inverter, and the PV array is decoupled (disconnected) from the input of the inverter. In this manner, the DC energy storage source provides power to the grid via the inverter. At 390 a determination is made as to whether the DC energy storage source has been depleted (nearly completely discharged). If the determination at 390 is negative (e.g., NO), the method 300 returns to 380. If the determination at 300 is positive (e.g., YES), the method returns to 310.

FIG. 7 illustrates a flowchart of an example method 400 for operating a power generation system in the second mode to concurrently charge a DC energy storage source and provide output power on a power grid (e.g., the power grid 52 of FIG. 1). The method 400 can be implemented, for example, by a controller (e.g., the controller 66 of FIG. 1 and/or the controller 124 of FIG. 2). At 410, the controller detects that an output of an inverter (e.g., the inverter 55 of FIG. 1) coupled to a PV array (e.g., the PV array 54 of FIG. 1) reaches a selectable grid limit. At 415, the controller sets an effective voltage of the PV array to substantially match an open circuit voltage of a DC energy storage source (e.g., the DC energy storage source 60 of FIG. 1). At 420, the controller electrically couples the PV array to the DC energy storage source. At 430, the controller adjusts an effective output voltage of the PV array based on a charging voltage of the DC energy storage source thereby concurrently charging the DC energy storage source and providing power to the power grid. In this manner, over charging of the DC energy storage source is prevented.

Figure 8:
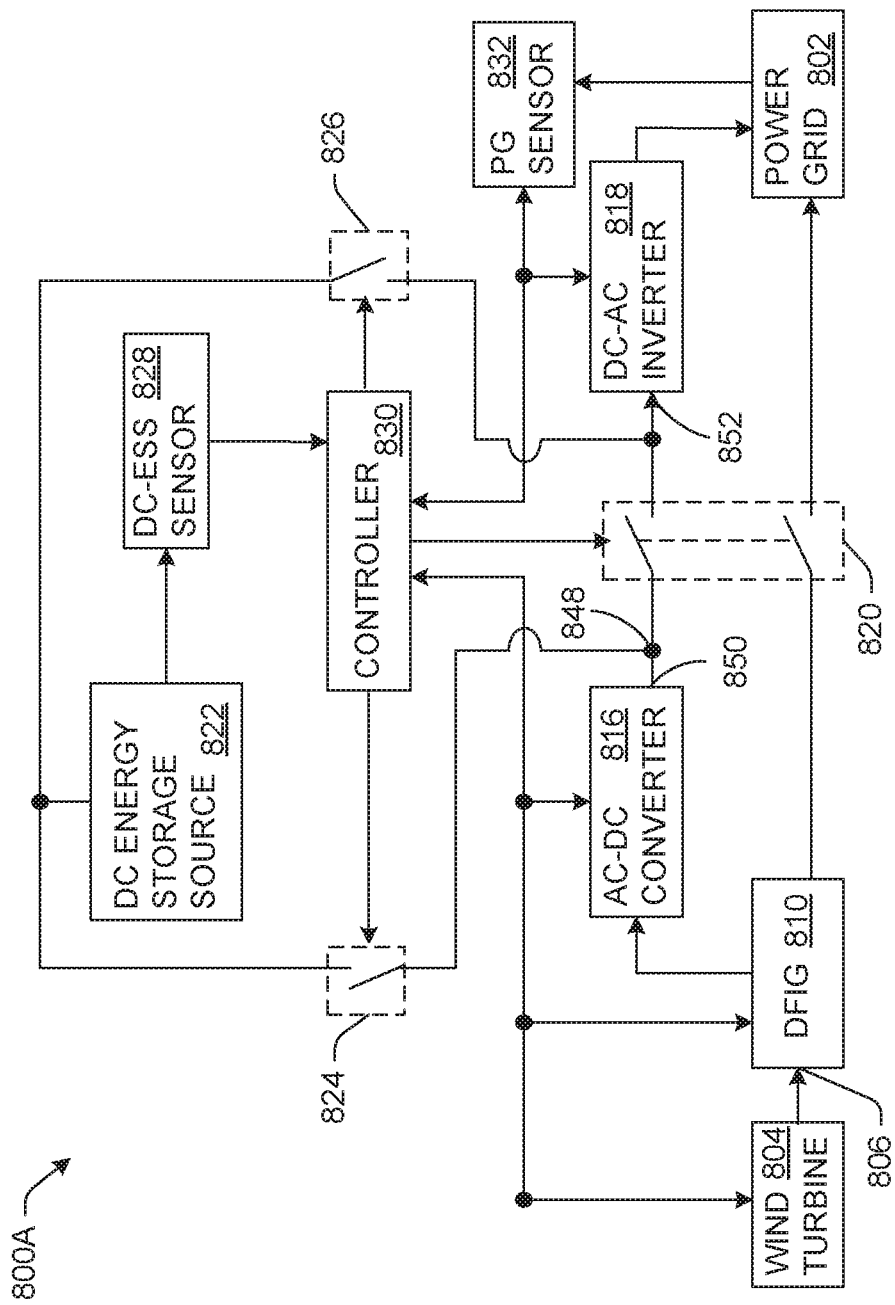
FIG. 8 illustrates an example power generation and storage system.

FIG. 8 illustrates another example of a power generation and storage system (hereinafter "system") 800A configured to provide alternating current (AC) power (energy) to a power grid 802. The system 800A includes a wind turbine 804 coupled to an input 806 of a three-phase doubly-fed induction generator (DFIG) 810. The DFIG 810 is disconnectedly coupled to the power grid 802. As stated previously, the term "disconnectedly coupled" indicates that two nodes (e.g., an output of one element and an input of another element) can be switchably coupled and de-coupled via a switch. The wind turbine 804, which may be a vertical or horizontal type, and the DFIG 810 are representative of multiple wind turbines coupled to multiple DFIG's as would be indicative of a wind farm.

Large size wind turbines are basically comprised of two types, fixed-speed and variable speed. The type determines the behavior of the wind turbine during wind speed variations. In fixed-speed wind turbines, three-phase asynchronous generators are generally used. Because the generator output is tied directly to the power grid, the rotation speed of the generator is generally fixed and thus, so is the rotation speed of the wind turbine rotor. Any fluctuation in wind speed causes the mechanical power at the wind turbine rotor to vary and, because the rotation speed is fixed, this causes the torque at the wind turbine rotor to vary accordingly. Whenever a wind gust occurs, the torque at the wind turbine rotor thus increases significantly while the rotor speed varies little. Therefore, every wind gust stresses the mechanical components (notably the gear box) in the wind turbine and causes a sudden increase in rotor torque, as well as in the power at the wind turbine generator output. Consequently, any fluctuation in the output power of a wind turbine generator is a source of instability in the power network to which it is connected.

In variable-speed wind turbines the rotation speed of the wind turbine rotor varies as the wind speed varies. This precludes the use of an asynchronous generator in such wind turbines as the rotation speed of the generator is quasi-constant when its output is tied directly to the grid. The same is true for synchronous generators which operate at a strictly constant speed when tied directly to the grid. Utilizing a DFIG for use with the wind turbines as opposed to the generators mentioned above overcomes these limitations. Specifically, the DFIG allows an output voltage and frequency to be maintained at constant values, regardless of a speed of the rotor and the wind speed by feeding AC currents having a variable frequency and amplitude into the rotor. Varying the amplitude and frequency of the AC currents maintains the amplitude and frequency of the voltages at the stator constant, despite variations in a rotor speed of the wind turbine and in the DFIG rotation speed caused by fluctuations in wind speed. This also allows operation without sudden torque variations at the wind turbine rotor, which decreases the stress imposed on the mechanical components of the wind turbine. In addition, adjusting the amount of reactive power exchanged between the DFIG and the power grid allows the system to maintain the power factor at unity. Still further, using the DFIG with a variable-speed wind turbine allows electrical power generation at lower wind speeds as opposed to the fixed-speed wind turbine using an asynchronous generator.

Figure 9:
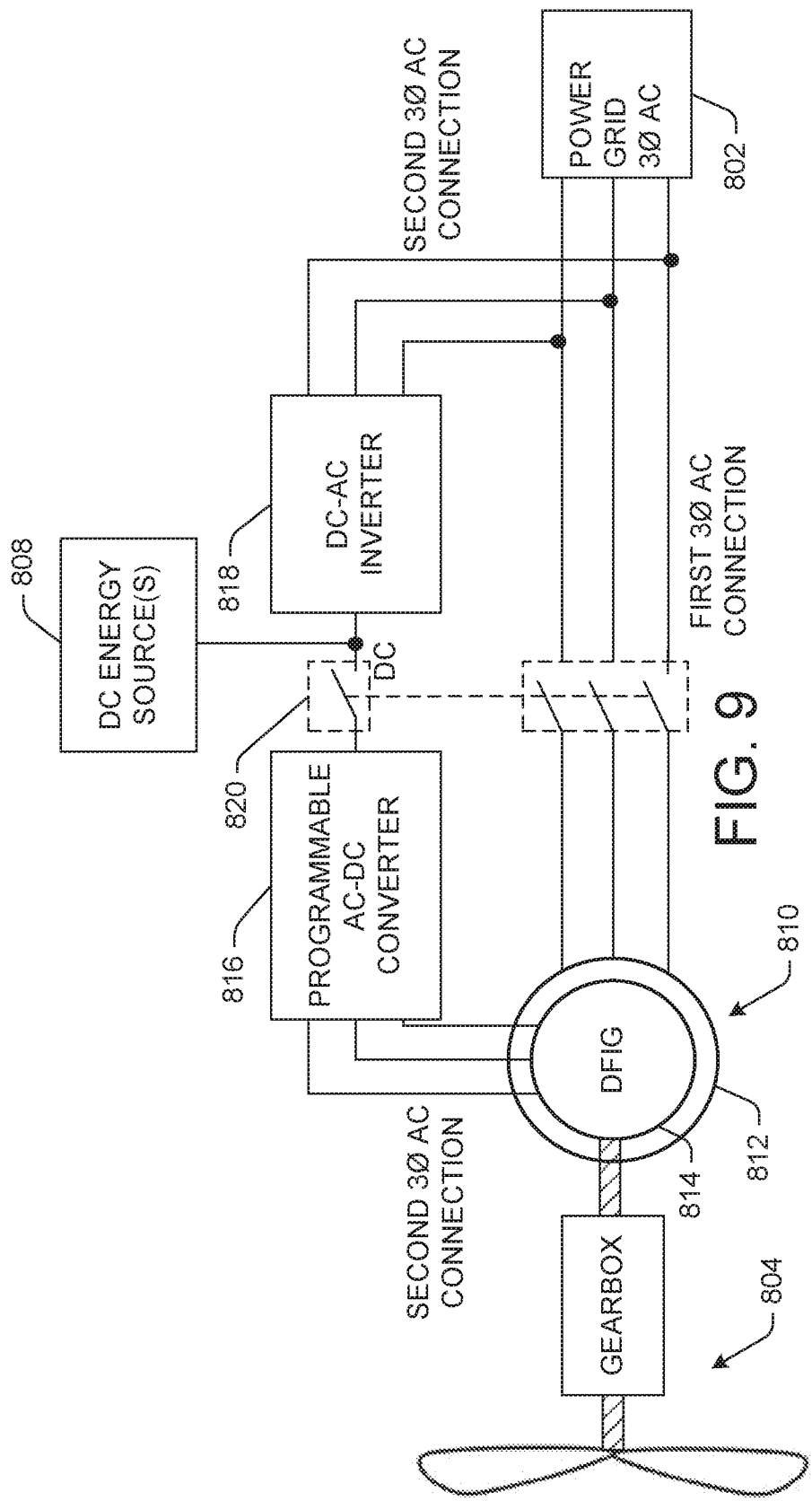
FIG. 9 illustrates an example doubly-fed induction generator.

FIG. 9 represents an example configuration that illustrates the connection of the DFIG 810 to the wind turbine 804, the power grid 802, and to one or more DC energy sources 808, such as a DC energy storage/source 822, a photovoltaic array, etc. described further below. The DFIG 810 includes a stator 812 disconnectedly coupled to the power grid 802 via a first 3-phase power connection and a rotor 814 disconnectedly coupled to the power grid via a second 3-phase power connection. An AC-DC converter 816 has an input coupled to the rotor 814 via the second 3-phase power connection and an output disconnectedly coupled to an input of a DC-AC inverter 818. An output of the DC-AC inverter 818 is coupled to the power grid 802. The DC-AC inverter 818 converts DC power from the AC-DC converter 816, as well as power sources 808, back to AC power for distribution to the power grid 802 that has characteristics (e.g., same frequency, voltage, etc.) compatible with that of the power grid 802. A switch (first switch) 820 (e.g., solid-state switch (e.g., transistor) or electromechanical switch (e.g., relay)) disconnectedly couples the output of the AC-DC converter 816 to the input of the DC-AC inverter 818, and disconnectedly couples the stator 812 to the power grid 802 via the first 3-phase power connection. The one or more DC energy sources 808 and/or power from the rotor 814 can supply DC energy to the DC-AC inverter 818 thereby driving the DC-AC inverter 818 to supply energy to the power grid 802. For example, some DC energy sources may include a DC energy storage/source and a photovoltaic array both of which are described further below, and as shown with way of the similar example of elements 54, 55 and 60 of FIG. 1.

A benefit of the configuration of the DFIG 810, the AC-DC converter 816, and the DC-AC inverter 818 is that the rotor 814 of the DFIG 810 may require power under certain conditions (e.g., during start-up). This power can be supplied by the one or more DC energy sources 808 via the AC-DC converter 816 as opposed from the power grid 802. Thus, the AC-DC converter 816 may be a bi-directional converter that facilitates the transfer of power between the DFIG 810 and the DC energy storage source 822. As a result, since this power is not supplied by the power grid 802, the DC-AC inverter 818 can be a unidirectional inverter thereby saving costs to the overall system.

Referring back to FIG. 8, the DC energy storage/source 822 (e.g., energy storage system (ESS)) is disconnectedly coupled to the output of the AC-DC converter 816 via a second switch 824 (e.g., solid-state switch (e.g., transistor) or electromechanical switch (e.g., relay)). As will be explained further below, the AC-DC converter 816 can be a programmable converter whereby a DC output voltage of the AC-DC converter 816 can be programmed to produce a variable DC output voltage to control the distribution of power throughout the system 800. Thus, the charging and discharging of the DC energy storage source 822 can be controlled by the programmable AC-DC converter 816. As a result, the second switch 824 can be an optional switch and implemented if it is desired to take the DC energy storage source 822 offline. The AC-DC converter 816 converts AC power to DC power for storage in the DC energy storage source 822. The DC energy storage source 822 is also disconnectedly coupled to an input of the DC-AC inverter 818 via a third switch 826 (e.g., solid-state switch (e.g., transistor) or electromechanical switch (e.g., relay)). The DC-AC inverter 818 converts DC power back to AC power from the DC energy storage source 822 for distribution to the power grid 802 that has characteristics (e.g., same frequency, voltage, etc.) compatible with that of the power grid 802.

The DC energy storage source 822 could be representative of a single battery, multiple batteries coupled as a battery bank or an alternative form of a DC power source, such as but not limited to fly wheels and/or flow batteries. In some examples, the DC energy storage source 822 can be implemented as a lithium ion battery or an array of lithium ion batteries. As some other non-limiting examples, the DC energy storage source 822 could be formed of nickel metal hydride battery cells, nickel cadmium battery cells, lead-acid battery cells, or nearly any type of chemical battery. The DC energy storage source 822 is coupled to a DC energy storage sensor 828 that measures characteristics of the DC energy storage source 822 (e.g., voltage, current and impedance). The DC energy storage sensor 828 provides substantially real-time (e.g., within approximately 5 seconds) DC energy storage data to a controller 830 that characterizes the properties measured by the DC energy storage sensor 828.

The controller 830 can be representative of a computing device (or multiple computing devices), such as a programmable logic controller (PLC), a microcontroller, etc. The controller 830 is configured/programmed to communicate with and control the system 800A to change operating modes of the system 800A based on operational characteristics of the wind turbine 804 and the DC energy storage source 822, based on the power requirements of the power grid 802, and based on environmental conditions (e.g., time of day/night, weather conditions, etc.). The controller 830 receives power grid information (e.g., output power requirements, currently generated output power, incoming power, etc.) via a power grid sensor 832 coupled to the power grid 802. In addition, the controller 830 can set a "selectable grid limit" that defines a configurable maximum amount of power that the DC-AC inverter 818 plus the power that the stator 812 of the DFIG 810 (e.g., 60-80% of the total DFIG output power) can supply to the power grid 802 at a given time (hereinafter "maximum supplied generated power"). Power supplied by the DC-AC inverter can be provided by one or more DC sources, such as the rotor 814 of the DFIG 810 (e.g., 20-40% of the total DFIG output power), a PV array described further below, and the DC energy storage source 822.

As power needs on the power grid 802 change the selectable grid limit can change accordingly. In addition, the selectable grid limit has a power level that is less than or equal to the maximum supplied generated power. For instance, in one example, the selectable grid limit may be set to approximately 90% of the maximum supplied generated power. It is noted that the selectable grid limit can be changed manually (e.g., by an end-user) and/or automatically. The changes can be based on changes to the environment of operation of the power generation system 800A and/or the power grid 802. Further, the changes to the selectable grid limit can be based on financial considerations, such as a changing amount of financial credit for power applied to the power grid 802.

In a first operating mode, the controller 830 is configured to close the first switch 820 and open the second and third switches 824, 826. In the first operating mode, power is supplied to the power grid 802 by the wind turbine 804 via the first and second 3-phase connection of the DFIG 810. The controller 830 monitors the grid information via the power grid sensor 832 and tracks the output power requirements of the power grid 802 to determine when the power supplied by the wind turbine 804 reaches the selectable grid limit.

In the second operating mode, the controller is configured to close the first and second switches 820, 824 and open the third switch 826. In the second operating mode, power is supplied to the power grid 802 by the wind turbine 804 via the DFIG 810 and power is concurrently stored in the DC energy storage source 822 via the AC-DC converter 816. In the second operating mode, the controller 830 determined that power supplied to the power grid 802 via the wind turbine 804 has reached the selectable grid limit and has therefore, closed the second switch 824 to allow the DC power converted by the AC-DC converter 816 to be stored in the DC energy storage source 822. Thus, in this configuration, the wind turbine 804 is supplying power to the power grid 802 and concurrently charging the DC energy storage source 822 for later use. The energy stored in the DC energy storage source 822 is energy that may otherwise be lost (e.g., clipped energy) as the wind turbine would operate in a curtailment mode where less than the total amount of available wind energy is converted to electric power and delivered to the power grid.

Alternatively, the controller 830 monitors the output voltage and current of the DC energy storage source 822 to determine if a minimum state of charge (SOC) of the DC energy storage source 822 is reached. In some examples, the minimum SOC is a level at which the DC energy storage source 822 has been nearly completely discharged (depleted). Upon reaching the minimum SOC, the controller 830 can switch the power generation system 800A to the second mode.

The controller 830 maintains the power generation system in the second operating mode until the DC energy storage source 822 is fully charged or that the maximum supplied generated power exceeds the selectable grid limit. Thus, the controller 830 can switch the system 800A either back to the first operating mode by opening the second switch 824 or to another operating mode described further below. Additionally or alternatively, the controller 830 can switch the system 800A to a different operating mode in response to detecting a decrease in a rate of power output by the controller 830, which could be due to an environmental element, (e.g., lack of wind). If the controller 830 detects a condition that favors charging of the DC energy storage source 822, the controller 830 can switch the system 800A back to the second operating mode. Thus, the process of switching between the first and second operating modes can be repeated as needed as long as the weather conditions are favorable for the operation of the wind turbine 804.

In a third operating mode, the controller 830 is configured to close the first and third switches 820, 826 and open the second switch 824. In the third operating mode, power is supplied to the power grid 802 by the wind turbine 804 via the DFIG 810 and power is concurrently supplied to the power grid 802 by the energy stored in the DC energy storage source 822 via the DC-AC inverter 818. In the third operating mode, the controller 830 determined that the DC-energy storage source 822 has reached its charging limit and/or that the output power requirement of the power grid 802 has not met the selectable grid limit. Thus, the controller 830 opens the second switch 824 and closes the third switch to allow stored DC power in the DC energy storage source 822 to discharge to the power grid 802 via the DC-AC inverter 818. In the third operating mode, the weather conditions may be such that the amount of power generated by the wind turbine 804 is insufficient to supply the required power to the power grid 802.

In a fourth operating mode, the controller 830 is configured to open the first and second switches 820, 824 and close the third switch 826 thereby disconnecting the DFIG 810 from the power grid 802 entirely. In the fourth operating mode, power is supplied to the power grid 802 by DC energy storage source 822 via the DC-AC inverter 818. In this operating mode, the controller 830 may have determined that the weather conditions are insufficient (e.g., lack of wind) to supply energy to the power grid 802 from the wind turbine 804. The controller 830 thus, opens the first and second switches 820, 824 and closes the third switch 826. AC power is then supplied to the power grid 802 from the DC energy storage source 822 and through the DC-AC inverter 818. Opening the first and second switches 820, 824 ensures that the DC power from the DC energy storage source flows to the power grid 802 and not back to the DFIG 810.

In both the third and fourth operating modes, the controller 830 monitors an output voltage and current of the DC energy storage source 822 to determine if a minimum state of charge (SOC) of the DC energy storage source 822 is reached. In some examples, the minimum SOC is a level at which the DC energy storage source 822 has been nearly completely discharged/depleted. Upon reaching the minimum SOC, the controller 822 can switch the system 800A to another operating mode described herein.

Figure 10:
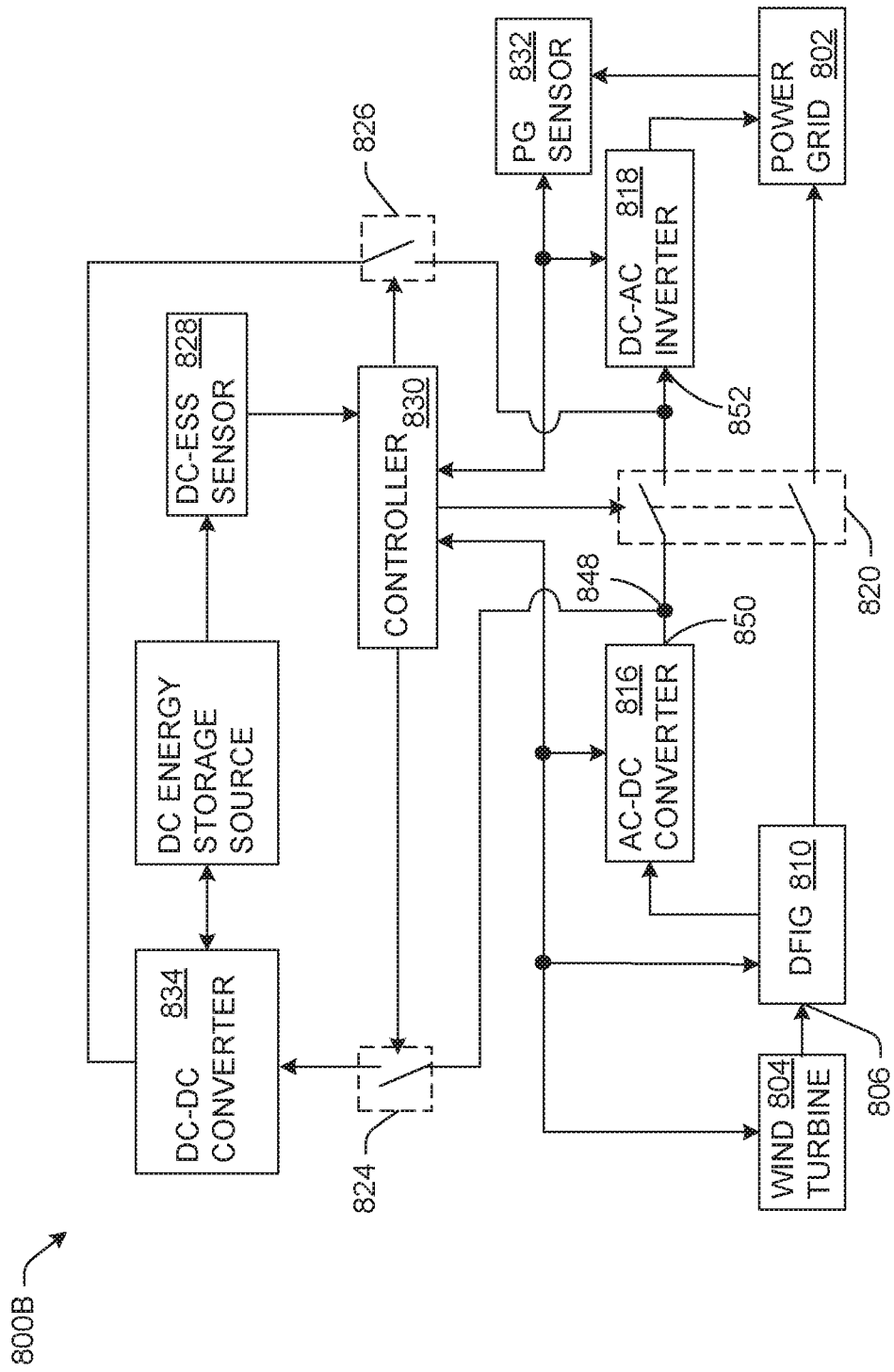
FIG. 10 illustrates another example of a power generation and storage system.

FIG. 10 illustrates another example of a power generation and storage system (hereinafter "system") 800B configured to provide alternating current (AC) power (energy) to the power grid 802. The system 800B is a modification to the example system 800A described above and illustrated in FIG. 8. Specifically, the system 800B further includes a DC-DC converter 834 (e.g., power optimizer) disposed between the AC-DC converter 816 and the DC energy storage source 822. All other elements, functions, and operating modes of the system 800B illustrated in FIG. 10 are the same as the example system 800A illustrated in FIG. 8 and thus, will not be repeated.

The DC-DC converter 834 includes an input disconnectedly coupled to the output of the AC-DC converter 816 via the second switch 824, and an output coupled to the input of the DC energy storage source 822. Thus, the DC-DC converter 834 receives the converted DC power from the AC-DC converter 816. Prior to storing the DC power in the DC energy storage source 822, the DC-DC converter 834 converts a voltage level of the DC power to a level that is compatible with an input and/or output voltage level of the DC energy storage source 822. Additionally, or alternatively, the DC-DC converter 834 can be used to essentially tune a performance of the wind turbine 804 via maximum power point tracking (MPPT) similar to that as described above to thereby maximize power extraction under all conditions (e.g., time of day/night, weather conditions, etc.).

Figure 11:
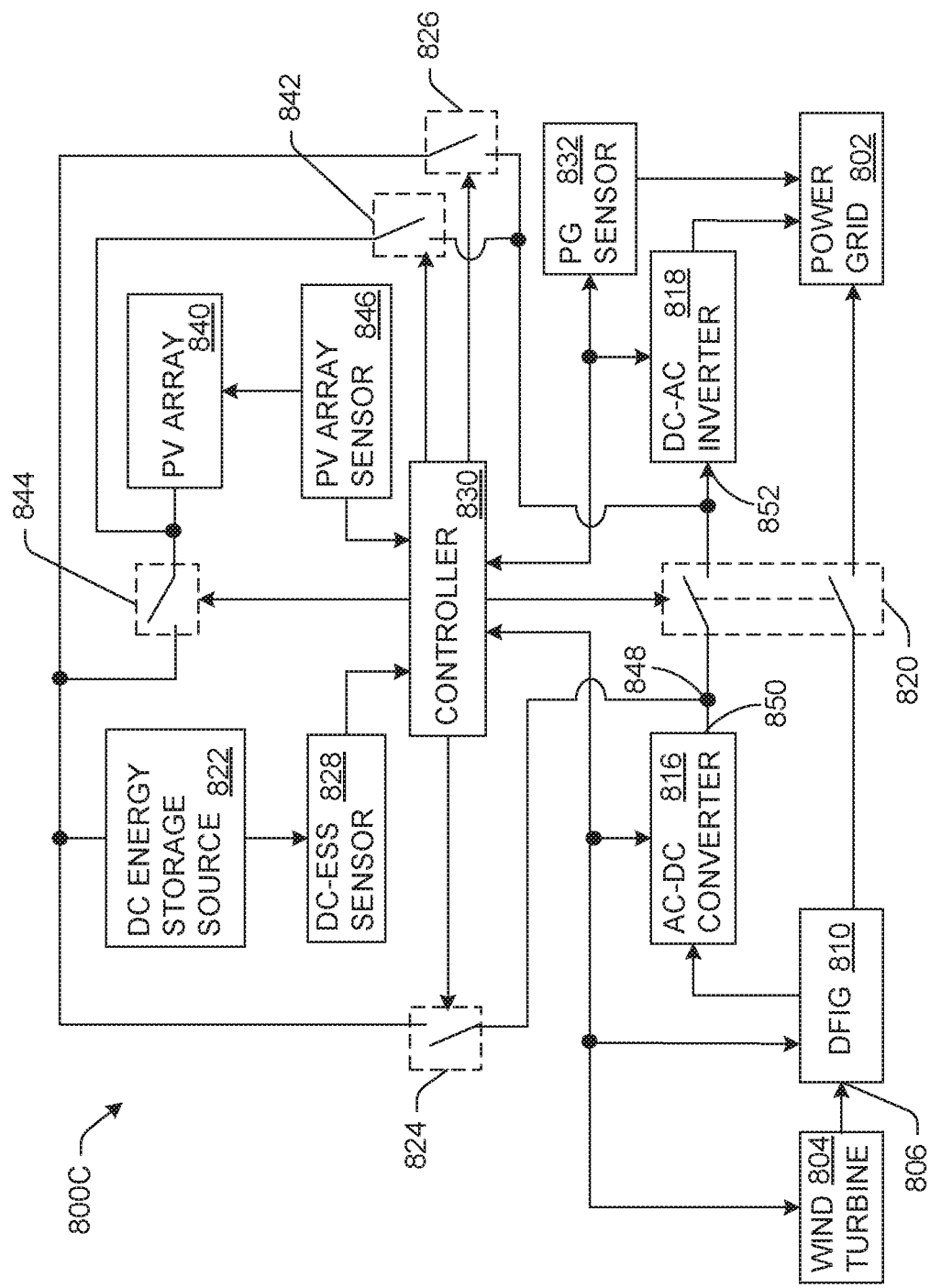
FIG. 11 illustrates another example of a power generation and storage system.

FIG. 11 illustrates an example of a hybrid power generation and storage system (hereinafter "system") 800C configured to provide alternating current (AC) power (energy) to the power grid 802. The system 800C is a modification to the example system 800A described above and illustrated in FIG. 8. Specifically, the system 800C further includes a photovoltaic (PV) array 840 that supplies energy to the power grid 802 and that provides storage energy to the DC energy storage source 822. All other elements and functions of the system 800C illustrated in FIG. 11 are the same as the example system 800A illustrated in FIG. 8 and thus, will not be repeated.

As in the example above, the PV array 840 is representative of multiple PV cells operating in concert. In particular, the PV array 840 may include any number of PV array groups, with each PV array group being configured to generate a DC power in response to solar irradiation. Each 840 group includes one or more PV strings with each of the 840 string including multiple PV cells (modules) coupled in series. It is appreciated that the number of PV groups and/or the number of PV strings can vary, with one, two, three, or four or more PV strings being included in each PV group, for example. Alternatively, the PV array 840 may be a single PV module.

The PV array 840 is disconnectedly coupled to the DC-AC inverter 818 via a fourth switch 842 (e.g., solid-state switch (e.g., transistor) or electromechanical switch (e.g., relay)) and disconnectedly coupled to the DC energy storage source 822 via a fifth switch 844 (e.g., solid-state switch (e.g., transistor) or electromechanical switch (e.g., relay)). The PV array 840 is also coupled to a PV array sensor 846 that measures characteristics (e.g., a voltage and current) of a signal output by the PV array 840. The PV array sensor 846 provides substantially real-time (e.g., within about 5 seconds) PV array data characterizing the measured signal to the controller 830.

In a fifth operating mode, the controller 830 is configured to open the first, second, third and fifth switches 820, 824, 826, 844 and close the fourth switch 842. Thus, in the fifth operating mode, power is supplied to the power grid 802 by the PV array 840. During the fifth operating mode, the controller 830 executes a Maximum Power Transfer Point Tracking (MPPT) procedure to set a Maximum Power Point (MPP) of the PV array 840. Specifically, during the MPPT procedure, the controller 830 can command the DC-AC inverter 818 to change an electrical property (e.g., input impedance) that changes an effective (observed) output voltage of the PV array 840 into the DC-AC inverter 818. The command may be based on changing conditions (e.g., environmental conditions) that affect the performance of the PV array 840. The DC-AC inverter 818 can then provide substantially real-time (e.g., within approximately 5 seconds) feedback to the controller 830 indicating the amount of current, voltage and/or power that is output to the power grid 802.

Upon detecting that the supplied power from the PV array 840 has reached the selectable grid limit, the controller 830 can switch the system to another operating mode as described herein based on operational characteristics of the wind turbine 804, the PV array 840, the DC energy storage source 822, based on the power requirements of the power grid 802, and based on environmental conditions (e.g., time of day/night, weather conditions, etc.).

For example, in a sixth operating mode, if the controller 830 determines that the supplied power to the power grid 802 from the PV array 840 is exceeding the selectable grid limit, the controller 830 can close the fifth switch 844. Thus, in the sixth operating mode, power is supplied from the PV array 840 to the power grid 802 via the DC-AC inverter 818 and power from the PV array 840 is concurrently stored in the DC energy storage source 822. Thus, in this configuration, any energy that would normally be lost (i.e., clipped energy) can be stored in the DC energy storage source 822 for later distribution to the power grid 802.

Figure 12:
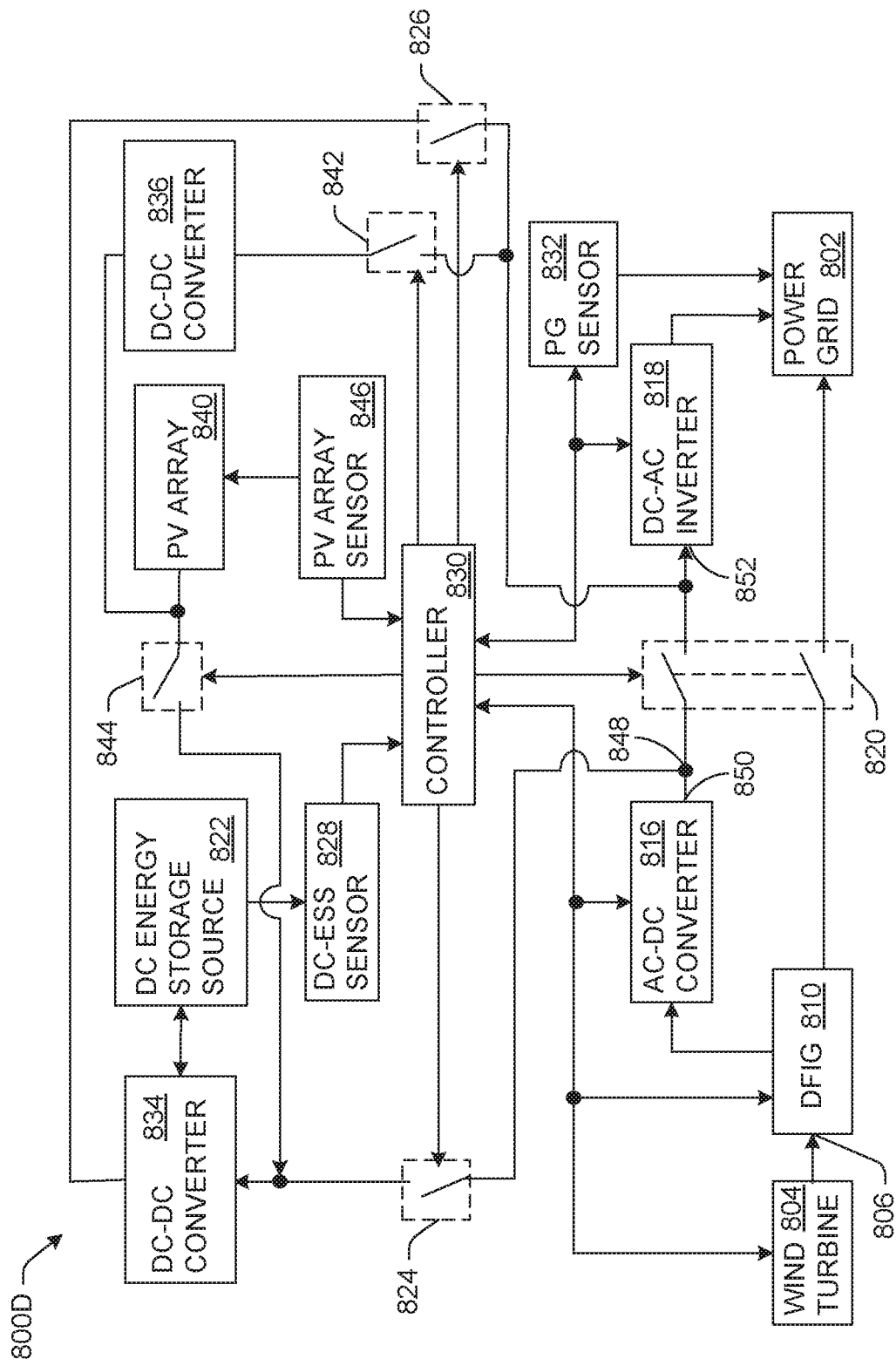
FIG. 12 illustrates another example of a power generation and storage system.

FIG. 12 illustrates another example of a hybrid power generation and storage system (hereinafter "system") 800D configured to provide alternating current (AC) power (energy) to the power grid 802. The system 800D is a modification to the example system 800C described above and illustrated in FIG. 11. Specifically, the system 800D further includes a first DC-DC converter 834 (e.g., power optimizer) and a second DC-DC converter 836 (e.g., power optimizer). All other elements, functions, and operating modes of the system 800D illustrated in FIG. 12 are the same as the example system 800C illustrated in FIG. 11 and thus, will not be repeated.

The first DC-DC converter 834 has an input disconnectedly coupled to both an output of the AC-DC converter 816 via the second switch 824 and to an output of the PV array 840 via the fifth switch 844. Thus, the first DC-DC converter 834 receives the converted DC power from the AC-DC converter 816 and DC power from the PV array 840. Prior to storing the DC power from either the wind turbine 804 or the PV array 840 in the DC energy storage source 822, the DC-DC converter 834 converts a voltage level of the DC power to a level that is compatible with an input and/or output DC voltage level of the DC energy storage source 822. Additionally, or alternatively, the first DC-DC converter 834 can be used to essentially tune a performance of the wind turbine 804 and/or the PV array 840 via maximum power point tracking (MPPT) similar to that as described above to thereby maximize power extraction under all conditions (e.g., time of day/night, weather conditions, etc.).

The second DC-DC converter 836 has an input disconnectedly coupled to an output of the DC energy storage source 822 and the output of the PV array 840. In addition, an output of the second DC-DC converter 836 is coupled to an input of the DC-AC inverter 818. The second DC-DC converter 836 receives the DC power from either the DC energy storage source 822 or the PV array 840 either separately or concurrently and converts the voltage level of the DC power to a DC voltage level that is compatible with the inverter to increase the efficiency of the system 800D. Additionally, or alternatively, the second DC-DC converter 836 can be used to essentially tune a performance of the wind turbine 804 and/or the PV array 840 via maximum power point tracking (MPPT) similar to that as described above to thereby maximize power extraction under all conditions (e.g., time of day/night, weather conditions, etc.).

As mentioned above, during operation of the system 800A, 800B, 800C, 800D (collectively "800"), the controller 830 monitors the output voltage and current of the DC energy storage source 822 to determine if the minimum state of charge (SOC) of the DC energy storage source 822 is reached. In some examples, the minimum SOC is a level at which the DC energy storage source 822 has been nearly completely discharged/depleted. Upon reaching the minimum SOC, the controller 822 can switch the system 800 to another operating mode described herein.

In other modes of operation, when all the switches are closed the DC voltage at a common DC junction (node) 848 between an output 850 of the AC-DC converter 816 and an input 852 of the DC-AC inverter 818 can be regulated (varied or set) by the controller 830 to control the distribution of power to the power grid 802, the performance of the PV array 840, and the charging/discharging of the DC energy storage source 822. More specifically, the controller 830 can program the DC output voltage of the AC-DC converter 816 to produce a variable DC output voltage at the DC junction 848 to control the distribution of power throughout the system 800. Thus, the AC-DC converter 816 can be a programmable AC-DC converter, as illustrated in FIG. 9. The voltage set at the DC junction 848 is determined by the amount of power that is available from the PV array 840 and if the DC energy storage source 822 is connected or disconnected.

In the example systems 800A, 800B that do not include the PV array 840, the charging and discharging of the DC energy storage source 822 depends on the SOC of the DC energy storage source. For example, if the DC power at the DC junction 848 is 1000V and the SOC of the DC energy storage source is 800V, the DC energy storage source will see a higher voltage and power will flow from higher voltage to the lower voltage. Thus, based on the power requirements of the power grid 802 some of the power from the AC-DC converter 816 will be delivered to the DC energy storage source 822 for charging and the remaining power will be delivered to the power grid 802. If the DC power at the DC junction 848 is higher, say for example 1200V, and the SOC of the DC energy storage source is still 800V, then more power from the AC-DC converter 816 will be delivered to the DC energy storage source 822 and the remaining power will be delivered to the power grid 802. If however, the SOC of the DC energy storage source 822 is greater than the DC voltage at the DC junction 848, then all the DC power at the DC junction coming from the AC-DC converter 816 is delivered to the power grid 802. Simultaneously, the DC energy storage source 822 will discharge thereby providing power to the power grid 802. If the controller 830 determines that the power supplied to the power grid 802 has reached the selectable grid limit, the controller 830 can disconnect the DC energy storage source 822 from the power grid 802 via the third switch 826.

In the example systems 800C, 800D that include the PV array 840, the MPPT procedure described above in relation to FIG. 3 is used to shift the MPP (maximum power point) of the PV array 840 to optimize power distribution to the power grid 802 and to optimize the charging/discharging of the DC energy storage source 822. Depending on the time of day, the MPPT will shift the MPP to maximize the power output by the PV array 840 to match that of the needs of the power grid 802 and/or the DC energy storage source 822. For example, on a sunny day during the daytime, power from the PCV array 840 will be maximized thereby requiring less power from the wind turbine 804 and/or the DC energy source 822. Conversely, during nighttime hours when the PV array is producing minimal (if any) power, more power will be provided to the power grid 802 by the wind turbine 804 and/or the DC energy storage source 822. In these scenarios, if the controller 830 determines that the power supplied to the power grid 802 has reached the selectable grid limit, the excess power will be used to charge the DC energy storage source 822.

As described above, to execute the MPPT procedure, the controller 830 sets an effective output voltage of the PV array 840 at the DC junction 848. The controller 830 adjusts (increases and decreases) the effective output voltage of the PV array 840 until the MPP (Maximum Power Point) is determined. As described herein, the MPP changes based on the time of day, environmental factors, etc. and the MPPT procedure periodically updates (e.g., about every 10 minutes) to determine an updated MPP. Thus, using the example above, if the DC power at the DC junction 848 is 1000V and the effective output voltage of the PV array 840 is, for example 700V, the PV array 840 will deliver 700V to the power grid 802 and the wind turbine will deliver 300V to the power grid 802. If the controller 830 determines that the power supplied to the power grid 802 from both the wind turbine 804 and the PV array 840 has reached the selectable grid limit, the excess power from the wind turbine 804 and/or the PV array 840 will be used to charge the DC energy storage source 822.

Figure 13:
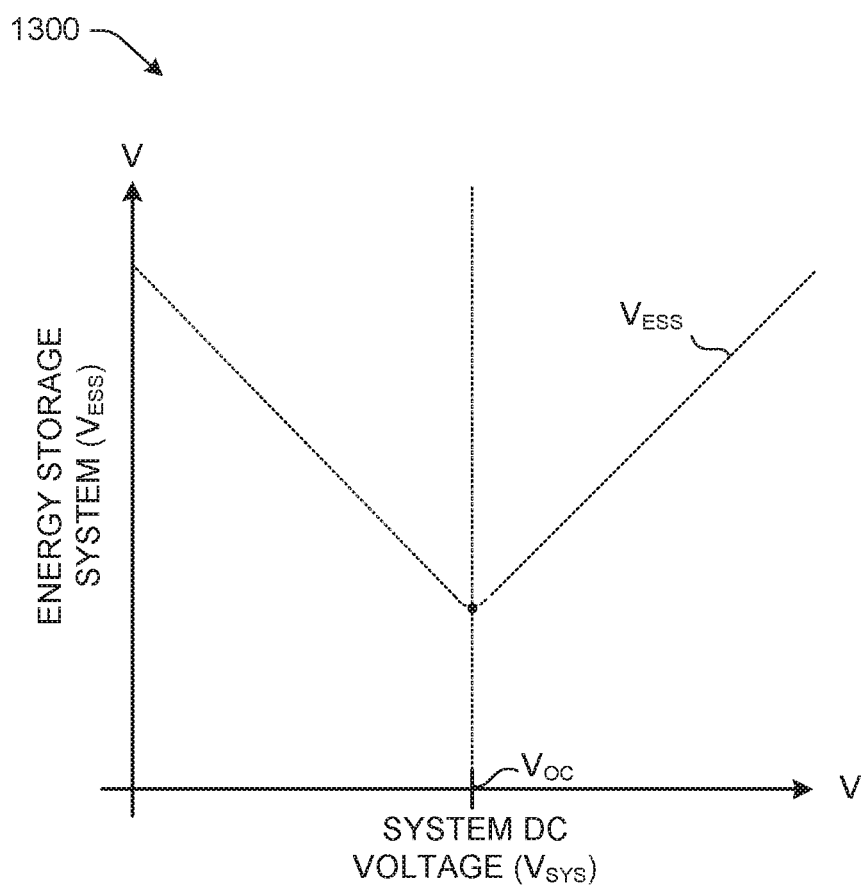
FIG. 13 is a plot illustrating a charging/discharging curve of an example energy storage system as a function of a system DC voltage and the energy storage system open circuit voltage.

Referring to FIG. 13, the controller 830 also monitors an open circuit voltage $V_{OC}$ of the DC energy storage source 822, as described herein, and a system DC voltage $V_{DCSYS}$ that includes available DC power from either the wind turbine 804 or from the wind turbine 804 and the PV array 840. FIG. 13 represents a plot 1300 that illustrates a charging/discharging curve $V_{ESS}$ for the DC energy storage source 822 based on the system DC voltage $V_{DCSYS}$ and the open circuit voltage $V_{OC}$ of the DC energy storage source 822. Thus, the controller 830 can control the system 800 to charge the DC energy storage source 822 when the system DC voltage $V_{DCSYS}$ is greater than the open circuit voltage $V_{OC}$ of the DC energy storage source 822. Similarly, the controller 830 can discharge the DC energy storage source 822 when the system DC voltage $V_{DCSYS}$ is less than the open circuit voltage $V_{OC}$ of the DC energy storage source 822.

Still further, the controller 830 can set the system DC voltage $V_{SYS}$ to a level above the open circuit voltage $V_{OC}$ of the DC energy storage source 822, which causes the DC energy storage source 822 to "resist" the voltages above the open circuit voltage $V_{OC}$ thereby absorbing the "excess" power, which charges the DC energy storage source 822. Similarly, the controller 830 can set the system DC voltage $V_{SYS}$ to a level below the open circuit voltage $V_{OC}$ of the DC energy storage source 822, in which case, the DC energy storage source 822 "resists" the drop in voltage by discharging DC power to the power grid 802. As a result, the controller 830 can modify the system DC voltage $V_{SYS}$ to thereby charge/discharge the DC energy storage source 822 under different conditions.

Figure 14:
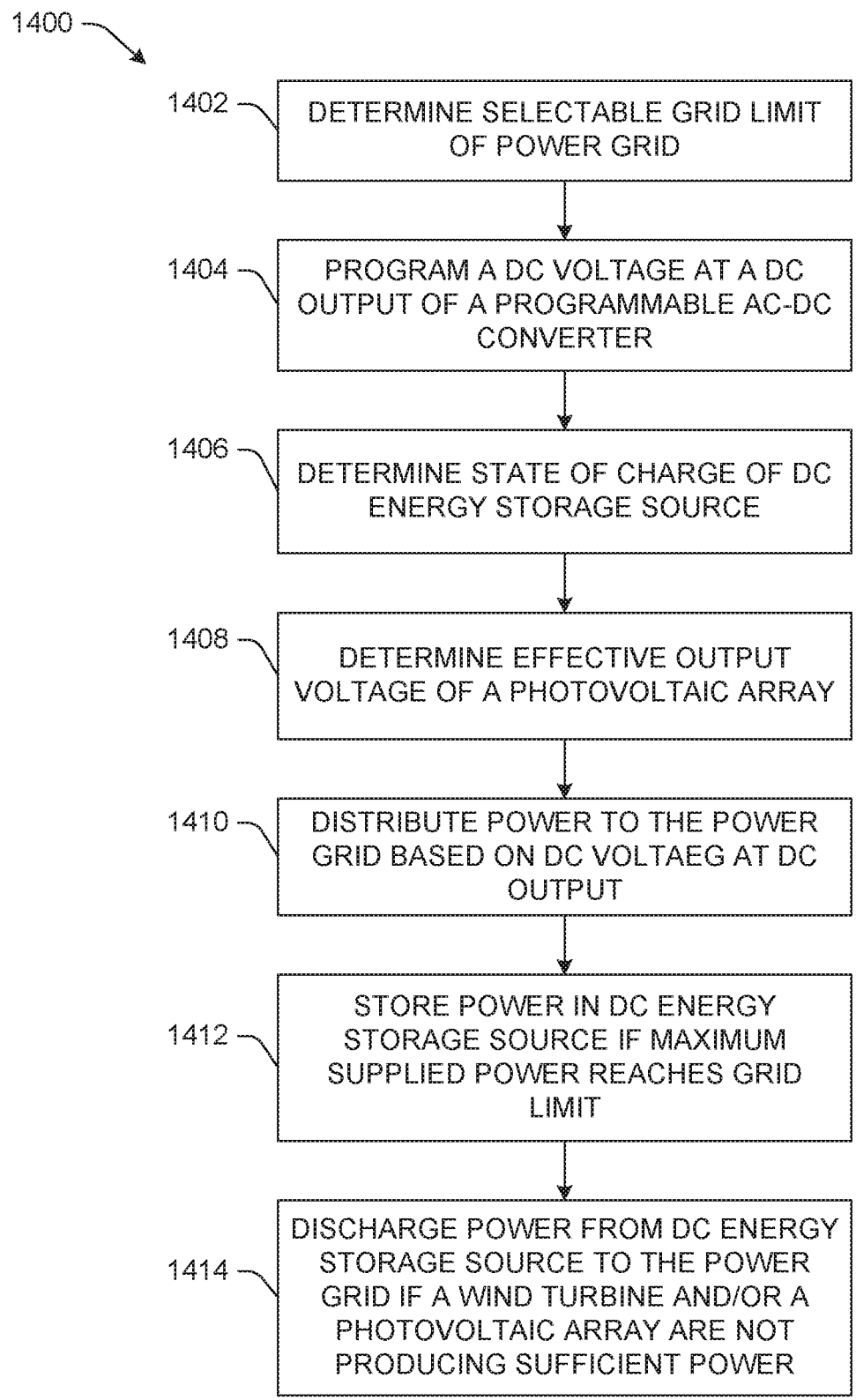
FIG. 14 illustrates a flowchart of an example method for controlling a power generation and storage system.

FIG. 14 illustrates a flowchart of an example method 1400 for controlling a power generation and storage system (e.g., the power generation system 800A, 800B, 800C, 800D) to selectively charge/discharge a DC energy storage source (e.g., the DC energy storage source 822) and provide output power on a power grid (e.g., the power grid 802). The method 1400 can be implemented, for example, by a controller (e.g., the controller 830). At 1402, the controller determines a selectable grid limit. At 1404, the controller programs a programmable AC-DC converter (e.g., the programmable AC-DC converter 816) to output a DC voltage to a DC junction (e.g., DC junction 848). At 1406, the controller determines a state of charge of the DC energy storage source. At 1408, the controller determines an effective output voltage of a photovoltaic array (e.g., the photovoltaic array 840). At 1410, power is distributed to the power grid from one or a combination of a wind turbine (e.g., the wind turbine 804) via a doubly-fed induction generator (e.g., the DFIG 810), and the DC energy storage source and the photovoltaic array via a DC-AC inverter (e.g., the DC-AC inverter 818) based on the DC voltage at the DC junction. At 1412, power is stored in the DC energy storage source from the wind turbine and/or the photovoltaic array if a maximum supplied generated power meets the selectable grid limit. At 1414, power is discharged from the DC energy storage source to the power grid when the operational state of the wind turbine and/or the photovoltaic array are offline (or are not producing enough power due to environmental conditions, e.g., not windy, not sunny, nighttime, etc.) and the maximum supplied generated power is less than the selectable grid limit.

Although several operating modes have been described herein, it is to be understood that a combination of the operating modes are possible based on the power requirements of the power grid, the operational state of the wind turbine and the PV array, the charging state of the DC energy storage source, and on environmental conditions (e.g., time of day/night, weather conditions, etc.).

Figure 15:
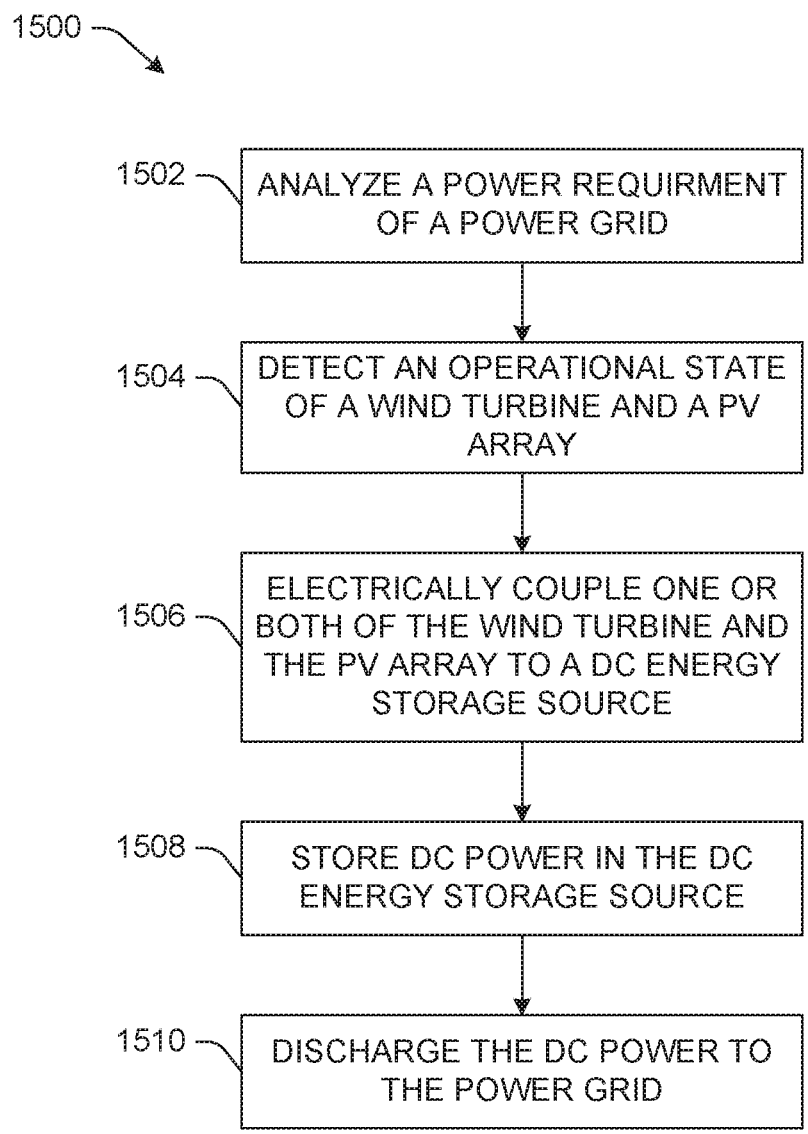
FIG. 15 illustrates a flowchart of an example method for charging/discharging an energy storage system compatible with a renewable energy system.

FIG. 15 illustrates a flowchart of an example method 1500 for operating a power generation and storage system in an energy storage/discharge mode. The method 1500 can be implemented, for example, by a controller (e.g., the controller 830). At 1502, the controller analyzes a power requirement of a power grid (e.g., power grid 802) via a power grid sensor (e.g., power grid sensor 832). At 1504, the controller detects an operational state of a wind turbine (e.g., wind turbine 804) and an operational state of a PV array (e.g., PV array 840) via a PV array sensor (e.g., PV array sensor 846). At 1506, the controller electrically couples at least one of the wind turbine and the PV array to a DC energy storage source (e.g., DC energy storage source 822). At 1508, DC power from either or both of the wind turbine and the PV array is stored in the DC energy storage source if power generated by one or both of the wind turbine and the PV array meet the power requirement of the power grid. The power from the wind turbine is converted to DC power via an AC-DC converter (e.g., AC-DC converter 816) prior to storage in the DC energy storage source. At 1510, the stored DC power from the DC energy storage source is discharged to the power when the controller detects that the operational state of the wind turbine and/or the photovoltaic array is offline and the power requirement of the power grid is below a power requirement threshold.

Integrating renewable energy systems (RES) into existing power distribution systems and into the power grid pose many challenges during operation. One such challenge is the unpredictability of the renewable system. Renewable systems are nature dependent and thus, cannot be easily regulated due to their unavailability and intermittency. For example, solar power depends on the presence of the sun and wind turbines depend on the wind, which is ever changing in speed and/or direction. Integrating an energy storage system (ESS) with the renewable energy systems can assist in the operation and power delivery of the system and can mitigate uncertainties in the system. Thus, optimizing performance and preventing premature failure of an energy storage system (ESS), such as the example DC energy storage source described herein is critical when integrating the ESS with the renewable energy systems such as the wind turbine and PV array described herein. Therefore, the selection and design parameters of the ESS should coincide with design characteristics of the renewable energy systems.

As mentioned above, the ESS could be representative of a single battery, multiple batteries coupled as a battery bank or an alternative form of a DC energy storage/power source, such as but not limited to mechanical storage (e.g., fly wheels), electro-chemical (e.g., hydrogen storage, battery energy storage systems (BESS)), electrical (e.g., super capacitors), thermal (e.g., molten salt), etc. Thus, one factor in selecting a proper ESS is determining the type of ESS based on the application of the renewable energy system. Another factor can be based on a need of the ESS (what is the ESS being used for)? In other words, why is the ESS required or what role does the ESS have in the renewable energy system? For example, the ESS may be required for delivering short-term backup power requiring a quick response time, load leveling and peak shaving, power quality support, providing power when the renewable energy system is offline requiring a suitable round trip efficiency, etc. Other factors in determining ESS selection include the ESS power and/or energy rating, power and/or energy density rating, response time, round trip efficiency, lifetime (e.g., years, cycles), etc.

In addition, factors to consider regarding the renewable energy system include total power capacity of the system and power capacity of individual systems in a hybrid system (e.g., wind turbine and solar panels) as described herein. Some factors regarding wind turbines include rated power output, voltage and current per phase, start-up speed, cut-in and cut-off speed, and swept speed. Some factors regarding PV arrays include power rating, cell type and efficiency, watts/square meter, maximum power point voltage, open circuit voltage, and short circuit voltage. Other factors relate to the location of the system and the environmental conditions at the location. For example, average wind speed, average number of sunny days, length of daylight hours, etc. contribute to the ESS selection.

Figure 16:
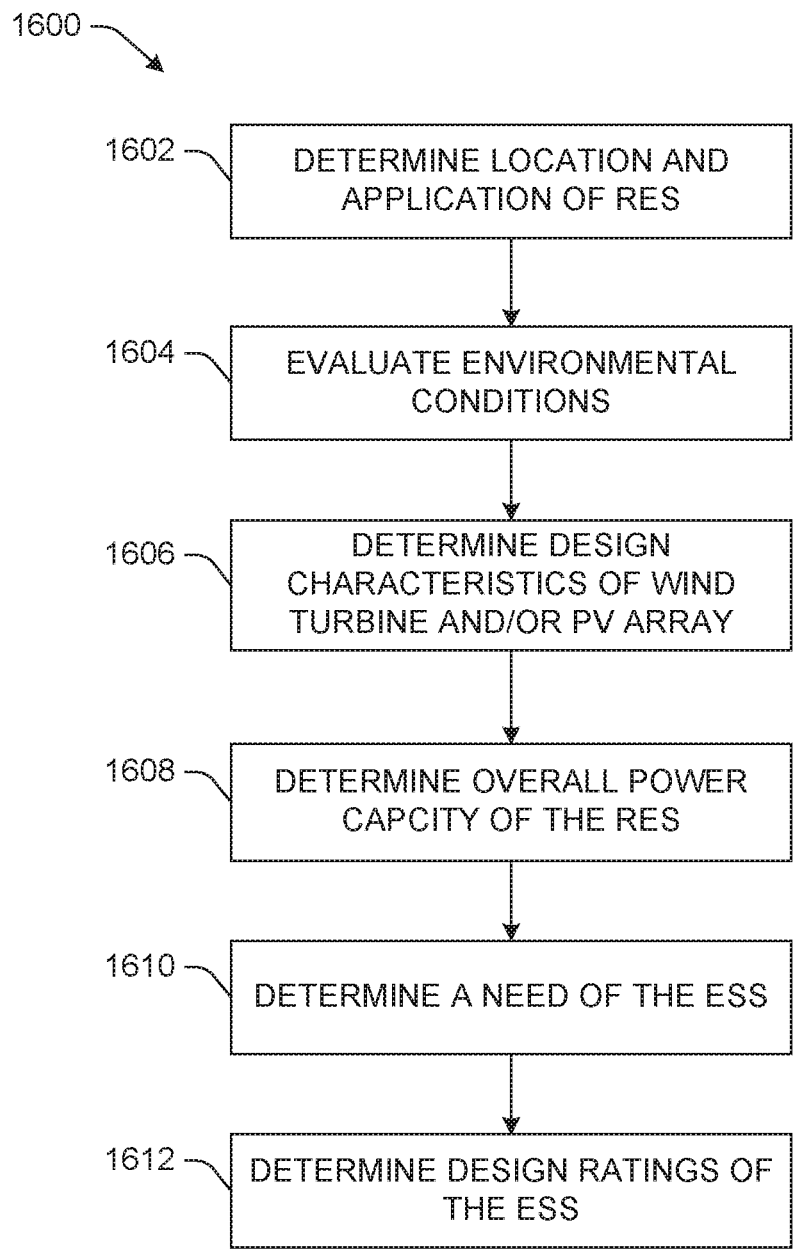
FIG. 16 illustrates a flowchart of an example method for selecting an energy storage system compatible with a renewable energy system.

FIG. 16 illustrates a flowchart of an example method 1600 for selecting an energy storage system (ESS) (e.g., DC energy storage source 822) for use with renewable energy systems (e.g., wind turbine(s) 804, PV array(s) 840). At 1602, a location and application of the renewable energy system are determined. At 1604, environmental conditions at the chosen location are evaluated. At 1606, design characteristics of components (e.g., wind turbine, PV array panels) of the renewable system are determined. At 1608, a power capacity of the overall is system is determined. At 1610, a need of the ESS is determined. At 1612, the ratings of the ESS are determined to optimize performance with the renewable energy system.

In view of the foregoing structural and functional description, those skilled in the art will appreciate that portions of the systems and methods disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, solid-state storage devices, optical storage devices, and magnetic storage devices.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A power generation and storage system comprising:
   a wind turbine;
   a doubly-fed induction generator connected to the wind turbine and to a power grid;

one or more DC energy sources coupled to the doubly-fed induction generator and to the power grid;
a programmable AC-DC converter having an input connected to a rotor of the doubly-fed induction generator and an output connected to the one or more DC energy sources and to the power grid; and
a controller that programs the output of the programmable AC-DC converter to produce a variable DC output voltage at a DC junction,
wherein power distributed to the power grid from the doubly-fed induction generator and the one or more DC energy sources is proportioned based on at least the variable DC output voltage at the DC junction,
wherein the one of more DC energy sources includes a DC energy storage source, and wherein the proportioned power distributed to the power grid is further determined by at least a state of charge of the DC energy storage source, and
wherein the one or more DC energy sources further includes a photovoltaic array and wherein the proportioned power distributed to the power grid is further determined by an effective output voltage of the photovoltaic array.

2. The power generation and storage system of claim 1 further comprising a DC-AC inverter having an input disconnectedly coupled to the output of the programmable AC-DC converter and to the one or more DC energy sources, and having an output connected to the power grid, the DC-AC inverter converting received DC power to AC power that has a frequency compatible with a frequency of the power grid.

3. The power generation and storage system of claim 2, wherein the controller connects and disconnects the one or more DC energy sources to and from the programmable DC-AC inverter based on the maximum supplied generated power, the selectable grid limit, and an operational state of the wind turbine.

4. The power generation and storage system of claim 1 further comprising a DC-DC converter coupled to the one or more DC energy sources and disconnectedly coupled to the output of the programmable AC-DC converter.

5. The power generation and storage system of claim 4, wherein when the DC-DC converter is coupled to the programmable AC-DC converter, the DC-DC converter receives DC power from the programmable AC-DC converter and adjusts a DC voltage level of the DC power prior to storing the DC power in one of the one or more DC energy sources.

6. The power generation and storage system of claim 1, wherein the programmable AC-DC converter is a bidirectional converter that allows a power transfer from the one or more DC energy sources to the doubly-fed induction generator under start-up conditions to thereby start the rotor of the doubly-fed induction generator.

7. The power generation and storage system of claim 1, wherein the DC energy storage source discharges to supply power to the power grid when the state of charge of the DC energy storage source is greater than the DC voltage at the DC junction.

8. The power generation and storage system of claim 1, wherein the DC energy storage source charges when the state of charge of the DC energy storage source is less than the DC voltage at the DC junction.

9. A power generation and storage system comprising:
a wind turbine;
a doubly-fed induction generator connected to the wind turbine and selectively coupled to a power grid;
a photovoltaic array coupled to the power grid;
a DC energy storage source coupled to the doubly-fed induction generator, the photovoltaic array, and the power grid, the DC energy storage source storing power from at least one of the doubly-fed induction generator and the photovoltaic array; and
a controller that selectively connects at least one of the doubly-fed induction generator and the photovoltaic array to the DC energy storage source in response to determining that a maximum supplied generated power meets a selectable grid limit.

10. The power generation and storage system of claim 9 further comprising a programmable AC-DC converter having an input connected to a rotor of the doubly-fed induction generator and an output disconnectedly coupled to the DC energy storage source and to the power grid, wherein the controller programs the programmable AC-DC converter to output a DC output voltage at a DC junction, and wherein power distributed to the power grid from the doubly-fed induction generator, the photovoltaic array, and the DC energy storage source is determined by at least the DC output voltage at the DC junction.

11. The power generation and storage system of claim 10 further comprising a DC-AC inverter having an output connected to the power grid and an input disconnectedly coupled to the programmable AC-DC converter, the photovoltaic array, and the DC energy storage source, the DC-AC inverter converting DC power received from the programmable AC-DC converter, the photovoltaic array, and from the DC energy storage source to AC power that has a frequency compatible with a frequency of the power grid.

12. The power generation and storage system of claim 11 further comprising a first DC-DC converter connected to the DC energy storage source and disconnectedly coupled the programmable AC-DC converter and a second DC-DC converter disconnectedly coupled to the DC energy storage source and disconnectedly coupled the DC-AC inverter.

13. The power generation and storage system of claim 12, wherein the programmable AC-DC converter converts the power from AC to DC and wherein the first DC-DC converter receives the DC power from the programmable AC-DC converter and adjusts a DC voltage level of the DC power prior to storing the DC power in the DC energy storage source.

14. The power generation and storage system of claim 11, wherein the controller connects and disconnects the DC energy storage source to and from the DC-AC inverter based on the selectable grid limit and an operational state of at least one of the wind turbine and photovoltaic array.

15. The power generation and storage system of claim 9 further comprising a photovoltaic array sensor that measures a voltage and current output of the photovoltaic array, wherein the controller receives the voltage and current output from the photovoltaic array sensor and sets an effective output voltage of the photovoltaic array.

16. A method comprising:
determining a selectable grid limit of a power grid;
programming a programmable AC-DC converter to output a DC voltage to a DC junction;
determining a state of charge of a DC energy storage source;
determining an effective output voltage of a photovoltaic array;
distributing power to the power grid from at least one of a wind turbine via a doubly-fed induction generator, and the DC energy storage source and the photovoltaic array via a DC-AC inverter based on the DC voltage at the DC junction; and storing power in the DC energy storage source from the at least one of the wind turbine and the photovoltaic array if a maximum supplied generated power meets the selectable grid limit.

17. The method of claim 16 further comprising discharging the power from the DC energy storage source to the power grid when the at least one of the wind turbine and the photovoltaic array are not producing sufficient power and the maximum supplied generated power is less than the selectable grid limit.

18. The method of claim 16, wherein the DC-AC inverter converts DC power from the programmable AC-DC converter, the photovoltaic array, and the DC energy storage source to AC power that has a frequency compatible with a frequency of the power grid.

* * * * *